United States Patent
Saleh et al.

(10) Patent No.: US 12,180,415 B2
(45) Date of Patent: *Dec. 31, 2024

(54) METHOD OF DRILLING A SHALE FORMATION WITH A DRILLING FLUID COMPOSITION

(71) Applicant: KING FAHD UNIVERSITY OF PETROLEUM AND MINERALS, Dhahran (SA)

(72) Inventors: Tawfik Abdo Saleh, Dhahran (SA); Azeem Rana, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,567

(22) Filed: Mar. 15, 2024

(65) Prior Publication Data

US 2024/0376366 A1    Nov. 14, 2024

Related U.S. Application Data

(63) Continuation of application No. 18/315,542, filed on May 11, 2023, now Pat. No. 11,981,857.

(51) Int. Cl.
*C09K 8/20* (2006.01)

(52) U.S. Cl.
CPC .......... *C09K 8/206* (2013.01); *C09K 2208/08* (2013.01); *C09K 2208/12* (2013.01)

(58) Field of Classification Search
None
See application file for complete search history.

(56) References Cited

U.S. PATENT DOCUMENTS

| | | | | |
|---|---|---|---|---|
| 4,544,756 A | * | 10/1985 | Patel | C09K 23/00 548/349.1 |
| 8,026,198 B2 | | 9/2011 | Miller | |
| 8,067,343 B2 | * | 11/2011 | Horton | C09K 8/512 166/305.1 |
| 10,920,123 B2 | | 2/2021 | Pu et al. | |

(Continued)

FOREIGN PATENT DOCUMENTS

GB    2602563 A    7/2022

OTHER PUBLICATIONS

Tian et al. ; Study of a Polyamine Inhibitor Used for Shale Water-Based Drilling Fluid ; ACS Omega 6 : 2021 : 12 Pages.

(Continued)

*Primary Examiner* — John J Figueroa
(74) *Attorney, Agent, or Firm* — Oblon, McClelland, Maier & Neustadt, L.L.P.

(57) ABSTRACT

A drilling fluid composition includes an aqueous base fluid, 0.01 to 5 wt. % of polyamine-functionalized activated carbon (AC-PAD), 0.1 to 10 wt. % of a shale material, 0.01 to 2 wt. % of a thickener, 0.1 to 10 wt. % of a fluid loss control additive, 0.01 to 5 wt. % of an adsorbent, and 1 to 20 wt. % of a borehole stabilizer. Each wt. % is based on a total weight of the drilling fluid composition. The AC-PAD is uniformly disposed on surfaces of the shale material. The shale material has an average pore size of 5 to 400 nanometers (nm). A method of preparing the AC-PAD and a method of drilling a subterranean geological formation.

14 Claims, 13 Drawing Sheets

(56) References Cited

U.S. PATENT DOCUMENTS

| | | | | |
|---|---|---|---|---|
| 11,084,974 B2* | 8/2021 | Dhawan | ............... | C09K 8/725 |
| 11,981,857 B1* | 5/2024 | Saleh | ............... | C09K 8/206 |
| 12,037,535 B1* | 7/2024 | Saleh | ............... | E21B 43/16 |
| 2014/0309149 A1* | 10/2014 | McDaniel | ............... | C09K 8/68 |
| | | | | 507/248 |
| 2017/0096593 A1 | 4/2017 | Step et al. | | |
| 2020/0017750 A1* | 1/2020 | Mahmoudkhani | ... | C09K 8/5753 |
| 2021/0355809 A1* | 11/2021 | Oduro | ............... | C09K 8/532 |

OTHER PUBLICATIONS

Huang et al. ; Fabrication of a Hydrophobic Hierarchical Surface on Shale Using Modified Nano-SiO2 for Strengthening the Wellbore Wall in Drilling Engineering ; Engineering 11 : Dec. 15, 2021 ; 10 Pages.

Ibrahim et al. ; Partially aminated acrylic acid grafted activated carbon as inexpensive shale hydration inhibitor ; Carbohydrate Research 491 ; Mar. 5, 2020 ; 7 Pages.

* cited by examiner

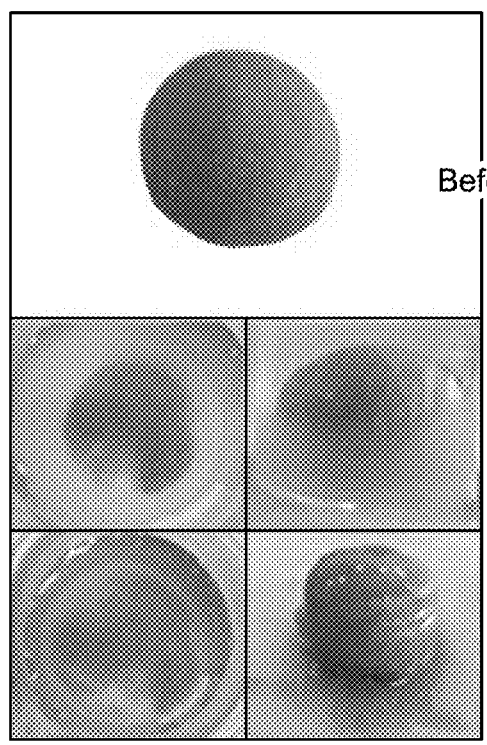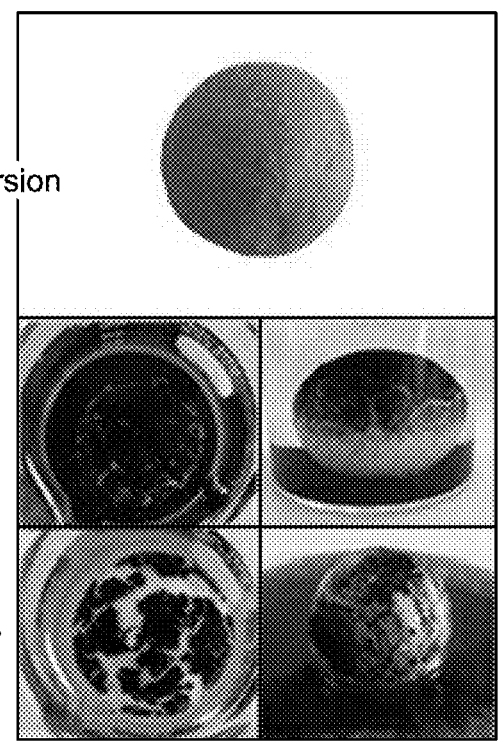
FIG. 10A                    FIG. 10B

METHOD OF DRILLING A SHALE FORMATION WITH A DRILLING FLUID COMPOSITION

CROSS-REFERENCE TO RELATED APPLICATIONS

The present application is a Continuation of U.S. application Ser. No. 18/315,542, now allowed, having a filing date of May 11, 2023.

STATEMENT REGARDING PRIOR DISCLOSURE BY THE INVENTORS

Aspects of this technology are described in "An investigation of polymer-modified activated carbon as a potential shale inhibitor for water-based drilling muds" published in Journal of Petroleum Science and Engineering, Volume 216, 110763, which is incorporated herein by reference in its entirety.

BACKGROUND

Technical Field

The present disclosure is directed to drilling fluids, and particularly to a method of making a drilling fluid composition and method for circulating the same into a wellbore formed by drilling a subterranean geological formation.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Shale hydration and dispersal is a major cause of borehole instability in the oil and gas industry. Chemical and mechanical stresses are critical factors in determining borehole stability. Drilling causes mechanical instability, however, the contact of drilling muds with borehole components leads to chemical instability. The drilling of shale formations in the presence of traditional water-based muds (WBM) can cause shedding, tight holes, and pipeline sticking that dramatically raise the cost of the drilling process. To maintain the smooth flow of the drilling process, borehole stability is very critical. Therefore, shale hydration and swelling inhibition is a critical area of research for the oil and gas industry.

Drilling operations typically use a variety of drilling fluids, including oil-based muds (OBM), synthetic-based muds (SBM), and WBM. Oil-based muds (OBM) demonstrate efficient inhibition, high lubricity, and temperature stability. However, their high cost and negative environmental impact have prompted the scientific community to search for more environmentally friendly alternatives. Synthetic-based muds (SBM) offer an efficient alternative to OBM, but their high cost and performance limitations have also led some to look for other solutions. As a result, there is now a growing interest in developing water-based muds (WBM) that can offer high efficiency comparable to OBM and SBM. One objective of WBMs is shale inhibition and swelling hindrance. Shale inhibitors, such as silicates, polyglycols, amines, nanoparticles, starches and celluloses, and cationic polymers, have been developed with varying mechanisms in drilling operations, however these drilling fluid additives have performance limitations. Despite the various types of drilling fluids used in drilling operations, no cost-effective and environmentally friendly drilling fluid has been developed yet.

Hence, it is one objective of the present disclosure to describe a chemical additive and corresponding WBM that may circumvent the drawbacks of prior art. A further objective of the present disclosure is to describe a method of making the chemical additive and a drilling fluid composition.

SUMMARY

In an exemplary embodiment, a drilling fluid composition is described. The drilling fluid composition includes an aqueous base fluid, 0.01 to 5 wt. % of polyamine-functionalized activated carbon (AC-PAD), 0.1 to 10 wt. % of a shale material, 0.01 to 2 wt. % of a thickener, 0.1 to 10 wt. % of a fluid loss control additive, 0.01 to 5 wt. % of an adsorbent, and 1 to 20 wt. % of a borehole stabilizer. Each wt. % is based on a total weight of the drilling fluid composition. In some embodiments, the AC-PAD is uniformly disposed on surfaces of the shale material. In some embodiments, the shale material has an average pore size of 5 to 400 nanometers (nm)

In some embodiments, the AC-PAD molecules are in the form of dendrimers having a plurality of at least one repeating unit selected from the group consisting of

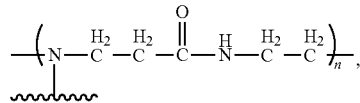

and

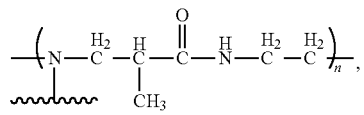

where n is any integer from 1 to 100 inclusive.

In some embodiments, each of the AC-PAD molecules includes a carboxylic acid-functionalized activated carbon core and a plurality of polyamidoamine branch structures. In some embodiments, at least one carboxyl group of the activated carbon core is covalently bonded to at least one amine group of at least one of polyamidoamine branch structures.

In some embodiments, the shale material includes at least one clay selected from the group consisting of sodium bentonite, calcium bentonite, potassium bentonite, sodium montmorillonite, and calcium montmorillonite.

In some embodiments, the shale material includes 50 to 65 wt. % kaolinite, 15 to 35 wt. % quartz, 5 to 15 wt. % muscovite, 1 to 8 wt. % microcline, 0.1 to 3 wt. % goethite, 0.1 to 3 wt. % gibbsite, and 1 to 10 wt. % illite based on the total weight of the shale material.

In some embodiments, the aqueous base fluid includes one or more selected from the group consisting of a foaming agent, a gelling agent, a pH control agent, a breaker, an oxidizing breaker, a gel stabilizer, a clay stabilizer, a corrosion inhibitor, a crosslinking agent, a scale inhibitor, a catalyst, a preservative, a biocide, and a thermal stabilizer.

In some embodiments, the thickener includes at least one selected from the group consisting of xanthan gum, guar gum, corn starch, gelatin, and a cellulosic thickener.

In some embodiments, the fluid loss control additive includes at least one selected from the group consisting of lignite, cellulose, and hemicellulose.

In some embodiments, the adsorbent includes poly aluminum chloride having a formula $[Al_2(OH)_nCl_{6-n}]_m$, where $1 \le n \le 5$, and $0 < m \le 10$.

In some embodiments, the borehole stabilizer includes at least one selected from the group consisting of sodium sulfite ($Na_2SO_3$) and potassium chloride (KCl).

In some embodiments, the drilling fluid composition has a pH in a range of 8 to 10.

In some embodiments, the drilling fluid composition has a shale material expansion rate of 1 to 15%, and a shale dispersion recovery rate of 75 to 95%, each based on an initial weight of the shale material, as determined by American Petroleum Institute (API) standard procedures (API, 2019).

In some embodiments, the drilling fluid composition has a reduction in swelling of at least 10% compared to a swelling value obtained from a drilling fluid composition without the AC-PAD, as determined by a linear swell meter.

In another exemplary embodiment, a method of making the drilling fluid composition is described. The method includes dispersing particles of the shale material in the aqueous base fluid to form a suspension. In some embodiments, the shale material has an average particle size in a range of 1500 to 4000 micrometers (μm). The method further includes mixing the AC-PAD, the thickener, the fluid loss control additive, the adsorbent, the borehole stabilizer, and the suspension to form the drilling fluid composition. In some embodiments, the AC-PAD is present in the drilling fluid composition at a concentration of 0.1 to 2 wt. % based on the total weight of the drilling fluid composition.

In some embodiments, the method further includes a method of preparing the AC-PAD by treating activated carbon (AC) from palm fibers in the presence of an acid solution including nitric acid to form carboxylic acid-functionalized AC. The method of preparing the AC-PAD also includes mixing the carboxylic acid-functionalized AC, an alcohol, and a polyamine to form a reaction mixture. In addition, the method of preparing the AC-PAD includes mixing the reaction mixture with an alkyl acrylate to form a crude mixture including AC-PAD molecules in the form of dendrimers. The method of preparing the AC-PAD involves separating the AC-PAD from the crude mixture, washing, and drying to form the AC-PAD.

In some embodiments, the alcohol includes at least one selected from the group consisting of methanol, ethanol, n-propanol, 2-propanol, 1-butanol, and 2-butanol. In some embodiments, the alkyl acrylate has a formula (I)

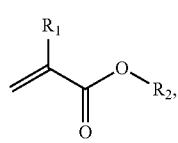

Formula [I]

where $R_1$, and $R_2$ are each independently selected from the group consisting of hydrogen, an optionally substituted alkyl, and an optionally substituted cycloalkyl.

In some embodiments, the polyamine includes at least one of ethylenediamine, hexamethylenediamine, N1,N1-dimethylethane-1,2-diamine, N1,N1-dimethylpropan-1,3-diamine, N1,N1-diethylethane-1,2-diamine, N1,N1-diethylpropane-1,3-diamine, spermidine, 1,1,1-tris(aminomethyl) ethane, tris(2-aminoethyl)amine, spermine, TEPA, DETA, TETA, AEEA, PEHA. HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene and heptamine.

In yet another exemplary embodiment, a method of drilling the subterranean geological formation is described. The method includes drilling the subterranean geological formation to form a wellbore therein. The method further includes circulating the drilling fluid composition into the wellbore during the drilling.

In some embodiments, the subterranean geological formation includes at least one selected from the group consisting of a shale formation, a clay formation, a tar sands formation, a coal formation, and a conventional hydrocarbon formation.

In some embodiments, the wellbore has a temperature of 20 to 300° C., and a pressure of 50 to 5500 pound-force per square inch (psi).

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10A depicts images representing appearance of mud balls immersed in water for 24 hours, according to certain embodiments;

FIG. 10B depicts images representing appearance of the mud balls immersed in 1% AC-PAD for 24 hours, according to certain embodiments;

DETAILED DESCRIPTION

Figure 1:
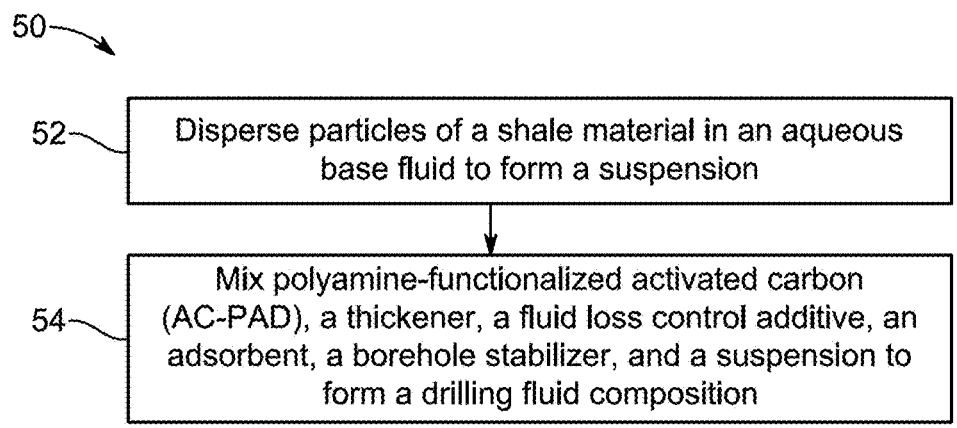
FIG. 1 is a schematic flow diagram of a method of making a drilling fluid composition, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "alkyl" refers to a straight or branched chain monovalent hydrocarbon radical having a C1-C10 carbon atoms.

As used herein, the term "cycloalkyl" refers to any univalent radical derived from a cycloalkane by removal of an atom of hydrogen having a C1-C10 carbon atoms.

As used herein, the term "substituted" refers to at least one hydrogen atom that is replaced with a non-hydrogen group, provided that normal valencies are maintained and that the substitution results in a stable compound. When a group is noted as "optionally substituted", the group may or may not contain non-hydrogen substituents. When present, the substituent(s) may be selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted and may be either unprotected or protected as necessary, as known to those skilled in the art.

As used herein, the term 'optionally substituted cycloalkyl' refers to the cycloalkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclic (preferably heterocycloamino) optionally substituted with one or two groups independently selected from alkyl, hydroxyl, alkoxy, alkylsulfonyl, halo, or —CONRR' where R and R' are as defined above.

As used herein, the term 'optionally substituted alkyl' refers to the alkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclic (preferably heterocycloamino) optionally substituted with one or two groups independently selected from alkyl, hydroxyl, alkoxy, alkylsulfonyl, halo, or —CONRR' where R and R' are as defined above.

As used herein, the term 'acrylates' refers to the esters, salts, and conjugate bases of acrylic acid with its derivatives. Acrylates are made from acrylate monomer, which usually includes esters which contains vinyl groups, that is two carbon atoms that are double bonded to each other, and directly attached to the carbonyl carbon of the ester group.

As used herein, the term "drilling" refers to making a hole in the mud with the help of a drilling equipment.

Aspects of the present disclosure are also directed towards injecting a drilling fluid composition, otherwise referred to as the drilling mud, which includes one or more components such as an aqueous base fluid, a shale material, a thickener, a fluid loss control additive, an adsorbent, a borehole stabilizer, and activated carbon functionalized with polyamine dendrimers (AC-PAD).

According to an aspect of the present disclosure, a drilling fluid composition is described. The drilling fluid composition includes an aqueous base fluid. Suitable examples of aqueous base fluid include fresh water, seawater, brine, or any other aqueous fluid compatible with the AC-PAD and the clay particles of the drilling fluid composition. The aqueous base fluid offers several advantages over the non-aqueous fluids as they are environmentally friendly, safe, and cost-effective. In some embodiments, these fluids may contain various additives to impart desirable chemical and physical properties to the composition. The aqueous base fluid includes one or more selected from the group consisting of a foaming agent, a gelling agent, a pH control agent, a breaker, an oxidizing breaker, a gel stabilizer, a clay stabilizer, a corrosion inhibitor, a crosslinking agent, a scale inhibitor, a catalyst, a preservative, a biocide, and a thermal stabilizer.

The foaming agent is a material such as a surfactant or a blowing agent that facilitates the formation of foam. A surfactant, when present in small amounts, reduces surface tension of a liquid, or increases its colloidal stability by inhibiting coalescence of bubbles. In some embodiments, the surfactants may be a nonionic surfactant, an anionic surfactant, a cationic surfactant, a viscoelastic surfactant, or a zwitterionic surfactant. In some embodiments, the surfactants may include, but is not limited to, ammonium lauryl sulfate, sodium lauryl sulfate (SLS), sodium dodecyl sulfate (SDS), alkyl-ether sulfates sodium laureth sulfate (sodium lauryl ether sulfate (SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-[(3-cholamidopropyl)dimethylammonio]-1-propanesulfonate), cocamidopropyl hydroxysultaine, ocamidopropyl betaine, phospholipids, and sphingomyelins. In some embodiments, the surfactant may include primary and secondary emulsifiers. Hereinafter, the primary and secondary emulsifiers are collectively referred to as the 'emulsifiers' or 'surfactants' and individually referred to as the 'emulsifier' or 'surfactant', unless otherwise specified. In some embodiments, the primary emulsifier is a polyaminated fatty acid. The primary emulsifier includes a lower hydrophilic-lyophilic balance (HLB) to the secondary emulsifier. In some embodiments, the primary emulsifier may include, but is not limited to, span 60, span 85, span 65, span 40, and span 20. In some embodiments, the primary emulsifier is sorbitan oleate, also referred to as the span 80. In some embodiments, the secondary emulsifier may include, but is not limited to, triton X-100, Tween 80, Tween 20, Tween 40, Tween 60, Tween 85, OP4, and OP 7. In some embodiments, the secondary emulsifier includes a biosurfactant such as a rhamnolipid surfactant.

The gelling agents are substances used to impart viscosity or stabilize formulations. The gelling agents may be obtained from natural, synthetic, or semisynthetic sources.

The pH control agent, also referred to as the buffer, is an additive of the drilling fluid composition that adjusts the pH of the drilling fluid composition. The pH control agent may include, but is not limited to, monosodium phosphate, disodium phosphate, sodium tripolyphosphate. In some embodiments, the pH of the drilling fluid composition is acidic or neutral. In some embodiments, the pH of the drilling fluid composition is basic. In the present disclosure, the drilling fluid composition has pH in a range of 8 to 10.

The breaker is an additive of the drilling fluid composition that provides a desired viscosity reduction in a specified period of time. The breaker may include, but is not limited to, oxidizing agents, such as sodium chlorites, sodium bromates, hypochlorites, perborate, persulfates, peroxides, and enzymes. The breaker can be emulsion breaker or reverse emulsion breaker. The emulsion breakers may include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The reverse emulsion breakers are organic polymers such as acrylic acid-based polymers, acrylamide-based polymers, polymerized amines, alkanolamines, thiocarbamates, and cationic polymers such as acrylamide diallyldimethylammonium chloride (DADMAC) polymer and/or methylacrylamide [3-(Methacryloylamino) propyl] trimethylammonium chloride (MAPTAC) polymers, copolymers of epichlorohydrin and dimethylamine or trimethylamine, copolymers of acrylamide and dimethylaminoethyl acrylate-methyl chloride quaternized, aluminium chlorohydrate (ACH) and poly-aluminium chlorides (PAC), acrylamides-DMAEA.MCQ copolymers.

The clay stabilizer is an additive of the drilling fluid composition that aids in the stabilization of shales and in controlling swelling clays. The clay stabilizer may include the alkali metal halide salt. In some embodiments, the alkali metal halide salt may be potassium chloride. In some embodiments, the alkali metal halide salt may include, but is not limited to, sodium chloride, lithium chloride, rubidium chloride, and cesium chloride. In some embodiments, the clay stabilizer may include an alkaline earth metal halide salt. In some embodiments, the alkaline earth metal halide salt may include, but is not limited to, calcium chloride, and magnesium chloride.

The corrosion inhibitor is a chemical compound that decreases the corrosion rate of a material, more preferably, a metal or an alloy, that comes into contact with the drilling fluid composition. The imidazoline can be, for example, derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (1A) or an imidazoline derivative. Representative imidazoline derivatives include an imidazolinium compound of Formula (2A) or a bis-quaternized compound of Formula (3A). In some embodiments, the corrosion inhibitor may include, but is not limited to, imidazolines, and amido amines. In some embodiments, the corrosion inhibitor may include, but is not limited to, oxides, sulfides, halides, nitrates, preferably halides, of metallic elements of group IIIa to VIa such as $SbBr_3$. The one or more additional corrosion inhibitors can be a phosphate ester, monomeric or polymeric fatty acid, alkoxylated amine, or mixture thereof.

The one or more corrosion inhibitor component can be a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a C3-C18 aliphatic alcohol with phosphorous pentoxide. The phosphate intermediate interchanges its ester groups with triethylphosphate producing a broader distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include C6 to C10 alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred. The one or more corrosion inhibitors can be a monomeric or polymeric fatty acid. Preferred monomeric fatty acids are C14-C22 saturated and unsaturated fatty acids as well as polymeric products obtained by polymerizing one or more of such fatty acids. The one or more corrosion inhibitors can be an alkoxylated amine. The alkoxylated amine can be an ethoxylated alkyl amine. The alkoxylated amine can be ethoxylated tallow amine.

In some embodiments, the drilling fluid composition may also include a crosslinking agent. The crosslinking agent is an additive of the drilling fluid composition that can react with multiple-strand polymers to couple molecules together, thereby creating a highly viscous fluid, with a controllable viscosity. The crosslinking agent may include, but is not limited to, metallic salts, such as salts of Al, Fe, B, Ti, Cr, and Zr, or organic crosslinking agents such as polyethylene amides and formaldehyde.

The scale inhibitor is an additive of the drilling fluid composition that inhibits the formation and precipitation of crystallized mineral salts that form scale. The scale inhibitor may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the scale inhibitor may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the drilling fluid composition may include metal sulfide scale removal agents such as hydrochloric acid.

The biocide is an additive of the drilling fluid composition that may kill microorganisms present in the drilling fluid composition. Biocides suitable for use may be oxidizing or non-oxidizing biocides. Oxidizing biocides can include, but are not limited to, bleach, chlorine, bromine, chlorine dioxide, peroxycarboxylic acid, peroxycarboxylic acid composition, and materials capable of releasing chlorine, bromine, or peroxide. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene (dimethyliminio)ethylene (dimethyliminio)ethylene dichloride, methylene bisthiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl) furan, beta-bromo-beta-nitrostyrene, beta-nitrostyrene, beta-nitrovinyl furan, 2-bromo-2-bromomethyl sulfone, S-(2-glutaronitrile, bis (trichloromethyl) hydroxypropyl)thiomethanesulfonate, tetrahydro-3,5-dimethyl-2H-1,3,5-hydrazine-2-thione, 2-(thiocyanomethylthio) benzothiazole, 2-bromo-4'-hydroxyacetophenone, 1,4-bis(bromoacetoxy)-2-butene, bis (tributyltin) oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo[2.2.1]heptane-2,3-dicarboxylic acid, 4,5-dichloro-2-n-octyl-4-isothiazoline-3-one, 5-chloro-2-methyl-4-isothiazolin-3-one, and 2-methyl-4-isothiazolin-3-one.

Suitable non-oxidizing biocides also include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

The drilling fluid composition includes 0.01 to 5 wt. % of polyamine-functionalized activated carbon (AC-PAD) based on a total weight of the drilling fluid composition, preferably 0.1 to 4.5 wt. %, preferably 0.5 to 4 wt. %, preferably 1 to 3.5 wt. %, preferably 1.5 to 3 wt. %, or even more preferably 2 to 2.5 wt. %, based on the total weight of the drilling fluid composition. Other ranges are also possible. The AC-PAD molecules are in the form of dendrimers having at least one repeating unit selected from the group consisting of

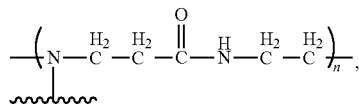

and

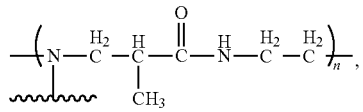

where n is any integer from 1 to 100 inclusive, preferably 2 to 80, preferably 3 to 60, preferably 4 to 40, preferably 5 to 20, or even more preferably 6 to 10. Other ranges are also possible. Dendrimers are a class of synthetic macromolecules with unique regularly branched three-dimensional structures, monodispersed, a large number of functional groups at the periphery, and a relatively non-toxic nature. Each of the AC-PAD molecules includes a carboxylic acid-functionalized activated carbon core and a plurality of polyamidoamine branch structures. At least one carboxyl group of the activated carbon core is covalently bonded to at least one amine group of at least one of polyamidoamine branch structures. The AC-PAD is uniformly disposed on surfaces of a shale material. In an embodiment, the shale material is deposited partially or wholly with at least one layer of the AC-PAD in a uniform and continuous manner. In a preferred embodiment, the AC-PAD form a continuous layer on the shale material. In an embodiment, particles of the AC-PAD form a monolayer on the shale material. In another embodiment, particles of the AC-PAD may include more than a single layer on the shale material. In some embodiments, at least 40% surface area of the shale material is covered by the AC-PAD particles based on a total surface area of the shale material, preferably at least 50%, preferably at least 60%, preferably at least 70%, preferably at least 80%, preferably at least 90%, preferably at least 95%, or even more preferably at least 99% based on the total surface area of the shale material. Other ranges are also possible.

The AC-PAD is present in the drilling fluid composition at a concentration of 0.1 to 2 wt. % based on a total weight of the drilling fluid composition, preferably 0.2 to 1.8 wt. %, preferably 0.3 to 1.6 wt. %, preferably 0.4 to 1.2 wt. %, preferably 0.5 to 1.0 wt. %, or even more preferably 0.6 to 0.8 wt. % based on the total weight of the drilling fluid composition. Other ranges are also possible.

The drilling fluid composition includes 0.1 to 10 wt. % of the shale material based on a total weight of the drilling fluid composition, preferably 1 to 8 wt. %, preferably 2 to 6 wt. %, or even more preferably 3 to 4 wt. % material based on the total weight of the drilling fluid composition. The shale material includes at least one clay selected from the group consisting of sodium bentonite, calcium bentonite, potassium bentonite, sodium montmorillonite, and calcium montmorillonite. The shale material includes 50 to 65 wt. %, more preferably 55 to 60 wt. %, and yet more preferably 57 wt. % kaolinite, 15 to 35 wt. %, more preferably 20 to 25 wt. %, and yet more preferably 23 wt. % quartz, 5 to 15 wt. %, more preferably 7 to 9 wt. %, and yet more preferably 8.9 wt. % muscovite, 1 to 8 wt. %, more preferably 3 to 4 wt. %, and yet more preferably 3.8 wt. % microcline, 0.1 to 3 wt. %, more preferably 1 to 2 wt. %, and yet more preferably 1.2 wt. % goethite, 0.1 to 3 wt. % more preferably 0.5 to 1 wt. %, and yet more preferably 0.7 wt. % gibbsite, and 1 to 10 wt. % more preferably 4 to 6 wt. %, and yet more preferably 5.7 wt. % illite, each wt. % based on a total weight of the shale material. The shale material has an average pore size of 5 to 400 nanometers (nm), preferably 50 to 350 nm, preferably 100 to 300 nm, preferably 150 to 250 nm, or even more preferably about 200 nm. Other ranges are also possible.

The drilling fluid composition includes 0.01 to 2 wt. % of a thickener based on a total weight of the drilling fluid composition, preferably 0.1 to 1.8 wt. %, preferably 0.3 to 1.6 wt. %, preferably 0.5 to 1.4 wt. %, preferably 0.7 to 1.2 wt. %, or even more preferably 0.9 to 1.0 wt. %, based on the total weight of the drilling fluid composition. Other ranges are also possible. The thickener includes at least one selected from the group consisting of xanthan gum, guar gum, corn starch, gelatin, and a cellulosic thickener. The thickener may also include XC-polymer.

The drilling fluid composition includes 0.1 to 10 wt. % of a fluid loss control additive based on a total weight of the drilling fluid composition, preferably 1 to 8 wt. %, preferably 2 to 6 wt. %, or even more preferably 3 to 4 wt. %, based on the total weight of the drilling fluid composition. Other ranges are also possible. The fluid loss control additive is an additive of the drilling fluid composition that controls loss of the drilling fluid composition when injected into the subterranean geological formation. In some embodiments, the drilling fluid composition may include multiple fluid loss control additives depending on the customized need of a user. In some embodiments, the fluid loss control additive may include, but is not limited to, starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the fluid loss control additive is at least one selected from the group consisting of the corn starch and poly(vinyl butyral)-co-vinyl alcohol-co-vinyl acetate (PVBA). The fluid loss control additive includes at least one selected from the group consisting of lignite, cellulose, and hemicellulose.

The drilling fluid composition includes 0.01 to 5 wt. % of an adsorbent based on a total weight of the drilling fluid composition, preferably 1 to 4 wt. %, preferably 2 to 3 wt. %, or even more preferably about 2.5 wt. % based on the total weight of the drilling fluid composition. Other ranges are also possible. The adsorbent includes poly aluminum chloride having a formula $[Al_2(OH)_nCl_{6-n}]_m$, where $1 \leq n \leq 5$, and $0 < m \leq 10$. In some embodiments, the drilling fluid composition includes 1 to 20 wt. % of a borehole stabilizer based on a total weight of the drilling fluid composition, preferably 2 to 16 wt. %, preferably 3 to 12 wt. %, or even more preferably 4 to 8 wt. %, based on the total weight of the drilling fluid composition. Other ranges are also possible. The borehole stabilizer includes at least one selected from the group consisting of sodium sulfite ($Na_2SO_3$) and potassium chloride (KCl).

The drilling fluid composition may also include a viscosifier. The viscosifier is an additive of the drilling fluid composition that increases viscosity of the drilling fluid composition. In some embodiments, the viscosifier may include, but is not limited to sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof. In some embodiments, the viscosifier may be bentonite. The 'bentonite' may refer to potassium bentonite, sodium bentonite, calcium bentonite, aluminum bentonite, and combinations thereof, depending on the relative amounts of potassium, sodium, calcium, and aluminum in the bentonite. In some embodiments, the viscosifier may be a corn starch.

The drilling fluid composition may also include a weighting agent. The weighting agent is an agent that increases an overall density of the drilling fluid composition in order to provide sufficient bottom-hole pressure to prevent an unwanted influx of formation fluids. In some embodiments, the weighting agent may include, but is not limited to, calcium carbonate, barite, sodium sulfate, hematite, siderite, and ilmenite. In some embodiments, the weighting agent may be hydrophobic metallic zinc nanoparticles.

In some embodiments, the drilling fluid composition may also include a deflocculant. Deflocculant is an additive of the drilling fluid composition that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the drilling fluid composition may also include a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC).

The drilling fluid composition may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA). A filtration rate agent is an additive for aqueous drilling fluid compositions to reduce the loss of fluids from a mud cake to pores of the formation during drilling of oil and gas wells. In some embodiments, the filtration rate agent is sodium carbonate.

The drilling fluid composition may further include a de-emulsifier. Preferably, the de-emulsifier includes an oxyalkylate polymer, such as a polyalkylene glycol. The drilling fluid composition may further include an asphaltene inhibitor. Suitable asphaltene inhibitors include, but are not limited to, aliphatic sulfonic acids, alkyl aryl sulfonic acids, aryl sulfonates, lignosulfonates, alkylphenol/aldehyde resins and similar sulfonated resins, polyolefin esters, polyolefin imides, polyolefin esters with alkyl, alkylenephenyl or alkylenepyridyl functional groups, polyolefin amides, polyolefin amides with alkyl, alkylenephenyl or alkylenepyridyl functional groups, polyolefin imides with alkyl, alkylenephenyl or alkylenepyridyl functional groups, alkenyl/vinyl pyrrolidone copolymers, graft polymers of polyolefins with maleic anhydride or vinyl imidazole, hyperbranched polyester amides, polyalkoxylated asphaltenes, amphoteric fatty acids, salts of alkyl succinates, sorbitan monooleate, and polyisobutylene succinic anhydride.

The drilling fluid composition may further include a paraffin inhibitor. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The drilling fluid composition may further include a water clarifier. Suitable water clarifiers include, but are not limited to, inorganic metal salts such as alum, aluminium chloride, and aluminium, chloro-hydrate, or organic polymers such as acrylic acid-based polymers, acrylamide-based polymers, polymerized amines, alkanolamines, thiocarbamates, and cationic polymers such as diallyl dimethylammonium chloride (DADMAC).

The drilling fluid composition may further include a hydrogen sulfide scavenger. Suitable hydrogen sulfide scavengers may include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The drilling fluid composition may further include a gas hydrate inhibitor. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g., potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g., sorbitol, mannitol)), methanol, propanol, ethanol, glycol ethers (such as diethyleneglycol monomethylether, ethyleneglycol monobutyleether), and alkyl or cyclic esters of alcohols (such as ethyl lactate, butyl lactate, methylethyl benzoate).

The drilling fluid composition may further include a kinetic hydrate inhibitor. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The drilling fluid composition may further include, but is not limited to, an acid, carrier, dispersant, inorganic salt, organic salt, additional clay stabilizer, antioxidant, polymer degradation prevention agent, permeability modifier, fracturing proppant, glass particulate, sand, fracture proppant/sand control agent, scavenger for $H_2S$, $CO_2$, and/or $O_2$, and friction reducing agent, salt, or mixture thereof.

According to the present disclosure, the drilling fluid composition may also include, but is not limited to, an organic sulfur compound, a sequestrant, solubilizer, cleaning agent, rinse aid, binder, processing aid, carrier, water-conditioning agent, aesthetic enhancing agent (e.g., dye, odorant, perfume), or mixtures thereof. Wt. % of each component of the drilling fluid composition is based on the total weight of the drilling fluid composition. Concentration of components of the drilling fluid composition may be varied to impart desired characteristics of the drilling fluid composition.

In some embodiments, the drilling fluid composition has a pH in a range of 7 to 12, preferably 7.5 to 11.5, preferably 8 to 11, preferably 8.5 to 10.5, preferably 9 to 10, or even more preferably about 9.5. Other ranges are also possible.

The drilling fluid composition has a shale material expansion rate of 1 to 15%, and a shale dispersion recovery rate of 75 to 95%, more preferably 85 to 87%, and yet more preferably 86.9%, each based on an initial weight of the shale material, as determined by American Petroleum Institute (API) standard procedures (API, 2019). In some embodiments, the drilling fluid composition has a reduction in swelling up of at least 10%, preferably at least 20%, preferably at least 40%, or even more preferably at least 80%, compared to a swelling value obtained from a drilling fluid composition without the AC-PAD, as determined by a linear swell meter. In some further embodiments, the drilling fluid composition has a reduction in swelling up to 60%, preferably up to 50%, preferably up to 40%, or even more preferably up to 30%, compared to a swelling value obtained from a drilling fluid composition without the AC-PAD, as determined by a linear swell meter.

Referring to FIG. 1, a schematic flow diagram of a method 50 of making the drilling fluid composition is illustrated. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure.

At step 52, the method 50 includes dispersing particles of the shale material in the aqueous base fluid to form a suspension. In some embodiments, the particles of the shale material can be dispersed in the aqueous base fluid via sonication. As used herein, the term 'sonication' refers to the process in which sound waves are used to agitate particles in a solution. In some embodiments, other modes of agitation known to those of ordinary skill in the art can also be used. Suspension is a heterogeneous mixture in which the solute particles do not dissolve, but get suspended throughout the bulk of the solvent, left floating around freely in the medium. An internal phase (solid) is dispersed throughout an external phase (fluid) through mechanical agitation, with the use of certain excipients or suspending agents. The shale material has an average particle size in a range of 1500 to 4000 micrometers (μm), preferably 2000 to 3500 μm, or even more preferably 2500 to 3000 μm. Other ranges are also possible. In some embodiments, the shale material includes clay. Suitable examples of clay that can be added to the aqueous base fluid include, but are not limited to, bentonite, kaolin, palygorskite, sepiolite, montmorillonite, and mixtures or salts thereof. In some preferred embodiments, the clay may be bentonite. In some more preferred embodiments, the bentonite may include sodium bentonite, calcium bentonite, potassium bentonite, sodium montmorillonite, calcium montmorillonite, or a combination thereof. In some embodiments, the aqueous base fluid includes freshwater, seawater, brine, or any other aqueous fluid compatible with AC-PAD and the clay particles of the drilling fluid composition.

At step 54, the method 50 includes mixing the AC-PAD, the thickener, the fluid loss control additive, the adsorbent, the borehole stabilizer, and the suspension to form the drilling fluid composition. The AC-PAD, the thickener, the fluid loss control additive, the adsorbent, the borehole stabilizer, and the suspension can be mixed by various techniques such as turbulence, diffusion, and chaotic advection.

In some embodiments, the AC-PAD is present in the drilling fluid composition at a concentration of 0.1 to 2 wt. % based on a total weight of the drilling fluid composition, preferably 0.5 to 1.5 wt. %, or even more preferably about 1 wt. % based on the total weigh of the drilling fluid composition. Other ranges are also possible. In some embodiments, AC-PAD particles are coated on surfaces of clay particles after the mixing.

In some embodiments, AC-PAD-coated clay particles have an average particle size ($D_{50}$) in a range of 500 to 5000 μm, preferably 1000 to 4000 μm, preferably 2000 to 3000 μm, or even more preferably about 2500 μm. Other ranges are also possible. In some embodiments, the AC-PAD-coated clay particles are in the form of a film after drying the drilling fluid composition. In some further embodiments, the film of the AC-PAD-coated clay particles formed after the drying has a smooth surface and a reduced porosity. As used herein, the term "porosity" generally refers to the fraction of void space within a porous material (e.g., clay particles). In some preferred embodiments, the film of the AC-PAD-coated clay particles has a porosity of less than 35%, preferably less than 25%, preferably less than 15%, preferably less than 5%, or even more preferably less than 1%. Other ranges are also possible.

Figure 2:
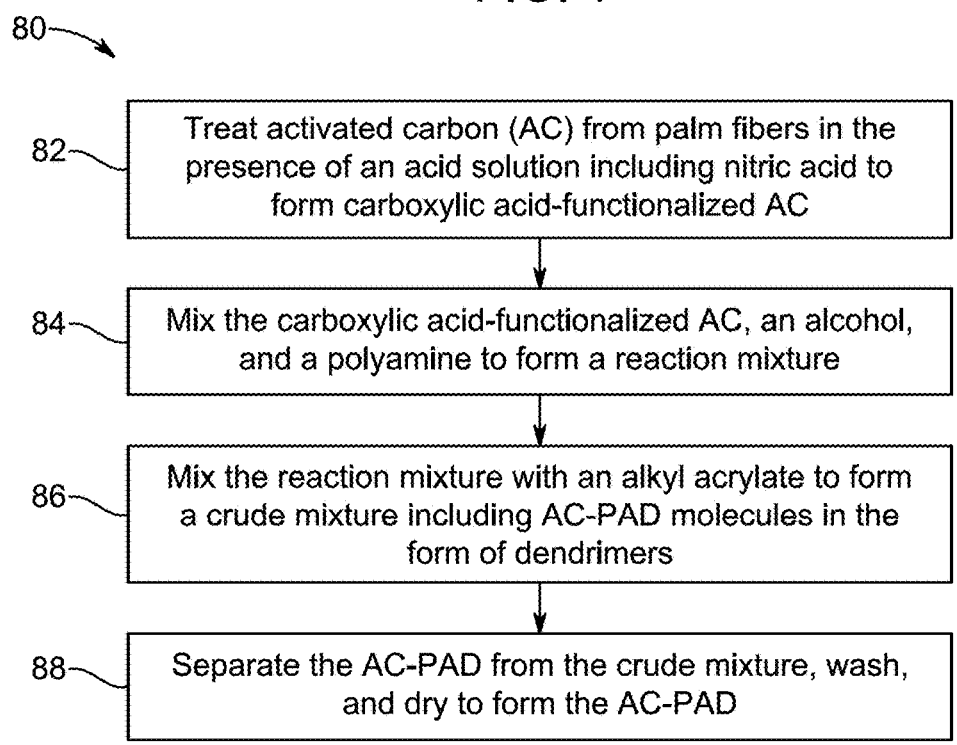
FIG. 2 is a schematic flow diagram of a method of preparing polyamine-functionalized activated carbon (AC-PAD), according to certain embodiments.

Referring to FIG. 2, a schematic flow diagram of a method 80 of preparing the AC-PAD is illustrated, according to an embodiment. The order in which the method 80 is described is not intended to be construed as a limitation, and any number of the described method steps may be combined in any order to implement the method 80. Additionally, individual steps may be removed or skipped from the method 80 without departing from the spirit and scope of the present disclosure.

At step 82, the method 80 includes treating activated carbon (AC) from palm fibers in the presence of an acid solution including nitric acid to form carboxylic acid-functionalized AC. The AC can be extracted from the stem, fronds, and empty fruit bunches of the palm tree using different physical and chemical methods. In some embodiments, the AC can be extracted from organic origin such as date fronds, bamboo, coconut husk, willow peat, wood, coir, lignite, coal, sugarcane bagasse, soybean bulls, nutshell, and petroleum pitch. The physical and chemical methods may include pyrolysis, soxhlet extraction, maceration, and hydrodistillation. In some embodiments, the nitric acid can be substituted by hydrochloric acid, hydrofluoric acid, citric acid, formic acid, acetic acid, or mixture thereof. In some embodiments, the palm fibers include but are not limited to date palm stem fibers made from date palm trunks, date palm leaf and leaf stem fibers made from date palm leaves and leaf stems, and date palm inflorescence fibers made from date palm inflorescences. In some further embodiments, the date palm fibers are obtained from date palm trees in Saudi Arabia area.

At step 84, the method 80 includes mixing the carboxylic acid-functionalized AC, an alcohol, and a polyamine to form a reaction mixture. The mixing can be performed by via stirring, swirling, or a combination thereof may be employed to form the reaction mixture. The alcohol includes at least one selected from the group consisting of methanol, ethanol, n-propanol, 2-propanol, 1-butanol, and 2-butanol. In some embodiments, the alcohol may be substituted by an organic solvent such as a hydrocarbon, a ketone, an ether, an alkylene glycol, a glycol ether, an amide, a nitrile, a sulfoxide, an ester, or a combination thereof. Examples of suitable organic solvents may further include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof. The polyamine includes at least one of ethylenediamine, hexamethylenediamine, N1,N1-dimethvlethane-1,2-diamine, N1,N1-dimethylpropan-1,3-diamine, N1,N1-diethylethane-1,2-diamine, N1,N1-diethylpropane-1,3-diamine, spermidine, 1,1,1-tris (aminomethyl) ethane, tris(2-aminoethyl)amine, spermine, TEPA, DETA, TETA, AEEA, PEHA. HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene and heptamine.

At step 86, the method 80 includes mixing the reaction mixture with an alkyl acrylate to form a crude mixture including AC-PAD molecules in the form of dendrimers. The alkyl acrylate has a formula (I).

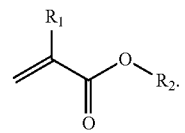

Formula [I]

Where $R_1$, and $R_2$ are each independently selected from the group consisting of hydrogen, an optionally substituted alkyl, and an optionally substituted cycloalkyl.

At step 88, the method 80 includes separating the AC-PAD from the crude mixture, washing, and drying to form the AC-PAD. The separation of the AC-PAD can be performed by ultracentrifugation in a range of 4500 to 5500, more preferably 5000 rotations per minute (rpm). Furthermore, the separated AC-PAD can be washed with water or ethanol. Moreover, the drying of the washed AC-PAD can be done by using heating appliances such as ovens, microwaves, autoclaves, hot plates, heating mantles and tapes, oil baths, salt baths, sand baths, air baths, hot-tube furnaces, and hot-air guns in a range of 35 to 45° C., more preferably 38 to 42° C., and yet more preferably 40° C. for 6-12 hours, more preferably 8 hours.

In the present disclosure, polyamine-functionalized activated carbon (AC-PAD), as an environment-friendly swelling inhibitor, is reported. To verify the adsorption of the AC-PAD on a clay surface, its inhibition mechanism is investigated by various kinds of techniques such as Fourier transforms infrared spectroscopy (FT-IR) analysis, Thermogravimetric analysis (TGA), Scanning electron microscopy (SEM), and Energy-dispersive X-Ray spectroscopy (EDX). The FT-IR confirms the attachment of the AC-PAD with the clay surface, while TGA demonstrates the shale materials' stabilization after the addition of the AC-PAD. The SEM establishes the plugging of nanopores of the shale material which is very crucial in swelling control. Effects of the AC-PAD on rheological features, shale inhibition, and linear swelling inhibition mechanism of clay are described. The outcomes reveal that 0.85 wt. % AC-PAD modified water-based muds (AC-PAD-WBM) display the highest shale recovery in dispersion analysis and inhibition stability tests and low swelling rate as related to $KCl_{(aq)}$ and conventional WBM. The high efficiency of the AC-PAD can be accredited to the synergetic effect of the composite. The AC blocks the pores, however, cationic PAD attaches to clay particles and hinders the interaction of water by making the clay surface hydrophobic. The AC-PAD carries functional groups that can disturb the hydrogen bonding between water and clay. The AC-PAD is an efficient alternative as compared to less efficient shale inhibitors and swelling control agents utilized in the drilling industry.

The crystalline structures of the shale material, the AC-PAD, and the AC-PAD-coated clay particles were characterized by the Fourier transform infrared spectra (FTIR). FTIR spectra were studied by using Fourier transform infrared spectra (Thermo-Scientific). For the Fourier transform infrared spectra characterization, the KBr discs of the samples were prepared by mixing and grounding the samples with KBr powder in mortar with pestle. The mixture was then shaped into discs under mechanical pressure. The samples discs are put into Fourier transform infrared spectra and spectral measurements were recorded in the wavenumber range of 500-4000 $cm^{-1}$. Prior to the above measurement, the samples are vacuum-dried at 60° C. for a duration of 24 h.

Figure 5:
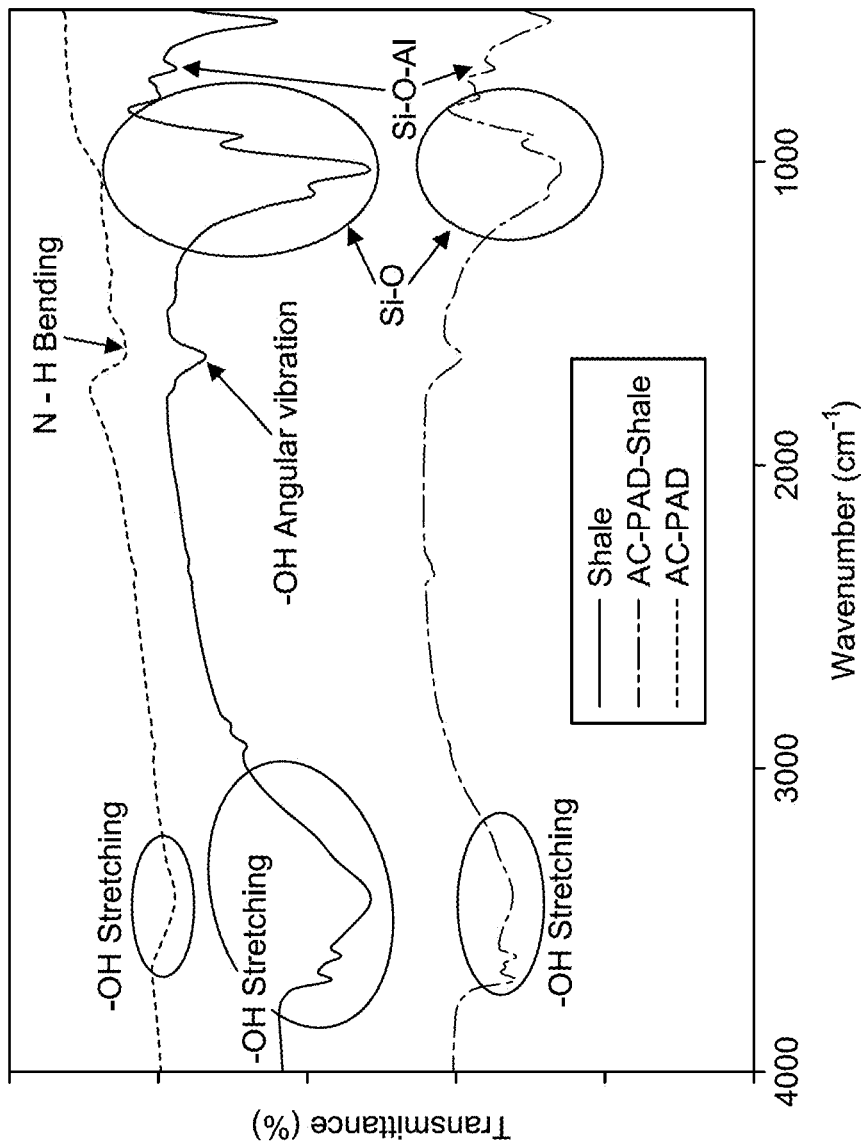
FIG. 5 depicts Fourier transforms infrared spectroscopy (FT-IR) spectra of graphene, the shale, the AC-PAD, and the shale modified with the AC-PAD, according to certain embodiments.

In some embodiments, the shale material has a first intense peak in a range of 1000 to 1500 $cm^{-1}$, a second intense peak in a range of 1600 to 1800 $cm^{-1}$, and a third intense peak in a range of 3000 to 4000 $cm^{-1}$ in an FTIR spectrum, as depicted in FIG. 5. In some further embodiments, the AC-PAD has at least one first intense peak in a range of 1600 to 1800 $cm^{-1}$, and a second intense peak in a range of 3000 to 4000 $cm^{-1}$ in the FTIR spectrum, as depicted in FIG. 5. In some preferred embodiments, the AC-PAD-coated clay particles has a first intense peak in a range of 800 to 1200 $cm^{-1}$, and a second intense peak in a range of 3000 to 4000 $cm^{-1}$ in the FTIR spectrum, as depicted in FIG. 5.

The thermostability of the shale material, the AC-PAD, and the AC-PAD-coated clay particles were characterized by thermal gravimetric analysis (TGA). TGA analysis is performed by using a thermogravimetric analyzer (SDT Q 600, TA Instruments, New Castle, USA). For the TGA analysis, the samples are measured by heating at an increment frequency of 5 to 20° C./min with the flow of nitrogen in a range of 25 to 150 ml/min, and a temperature of up to 1200° C. Other ranges are also possible.

Figure 6:
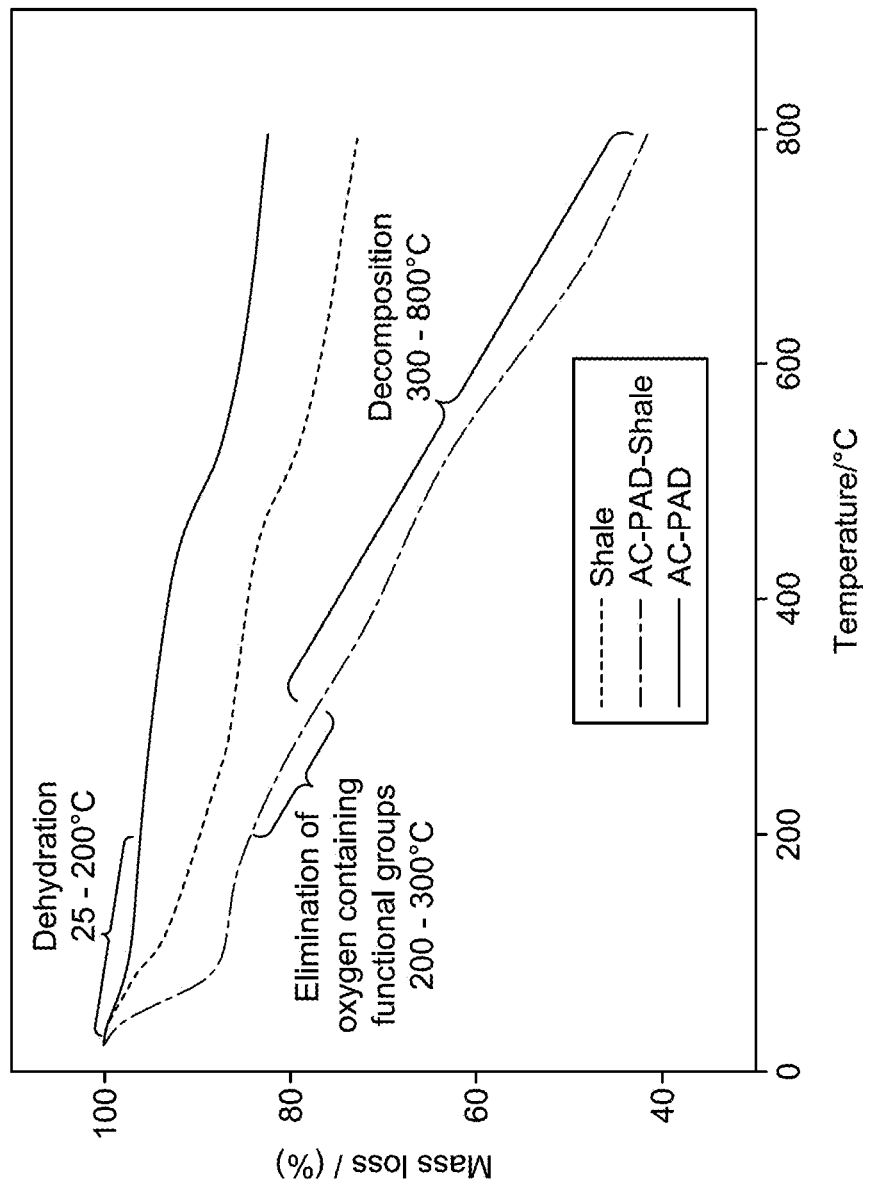
FIG. 6 depicts thermogravimetric analysis (TGA) data of the AC-PAD, the shale, and the shale modified with the AC-PAD, according to certain embodiments.

In some embodiments, the shale material has a mass loss of up to 50 wt. % based on an initial weight of the shale material, as depicted in FIG. 6. In some further embodiments the AC-PAD has a mass loss of up to 60 wt. % based on an initial weight of the AC-PAD, as depicted in FIG. 6. In some preferred embodiments, the AC-PAD-coated clay particles has a mass loss of up to 20 wt. % based on an initial weight of the AC-PAD-coated clay particles, as depicted in FIG. 6. Other ranges are also possible.

The crystalline structures of the shale material, the AC-PAD, and the AC-PAD-coated clay particles were characterized by a Powder X-ray diffraction (P-XRD), respectively. In some embodiments, the XRD patterns are collected in a Bruker D2 PHASER benchtop diffractometer equipped with a Cu—Kα radiation source (λ=0.154 nm) for a 2θ range extending between 5 and 80°, preferably 10 and 60°, further preferably 20 and 40° at an angular rate of 0.005 to 5° $s^{-1}$, preferably 0.1 to 3° $s^{-1}$, or even preferably 0.5° $s^{-1}$.

Figure 7:
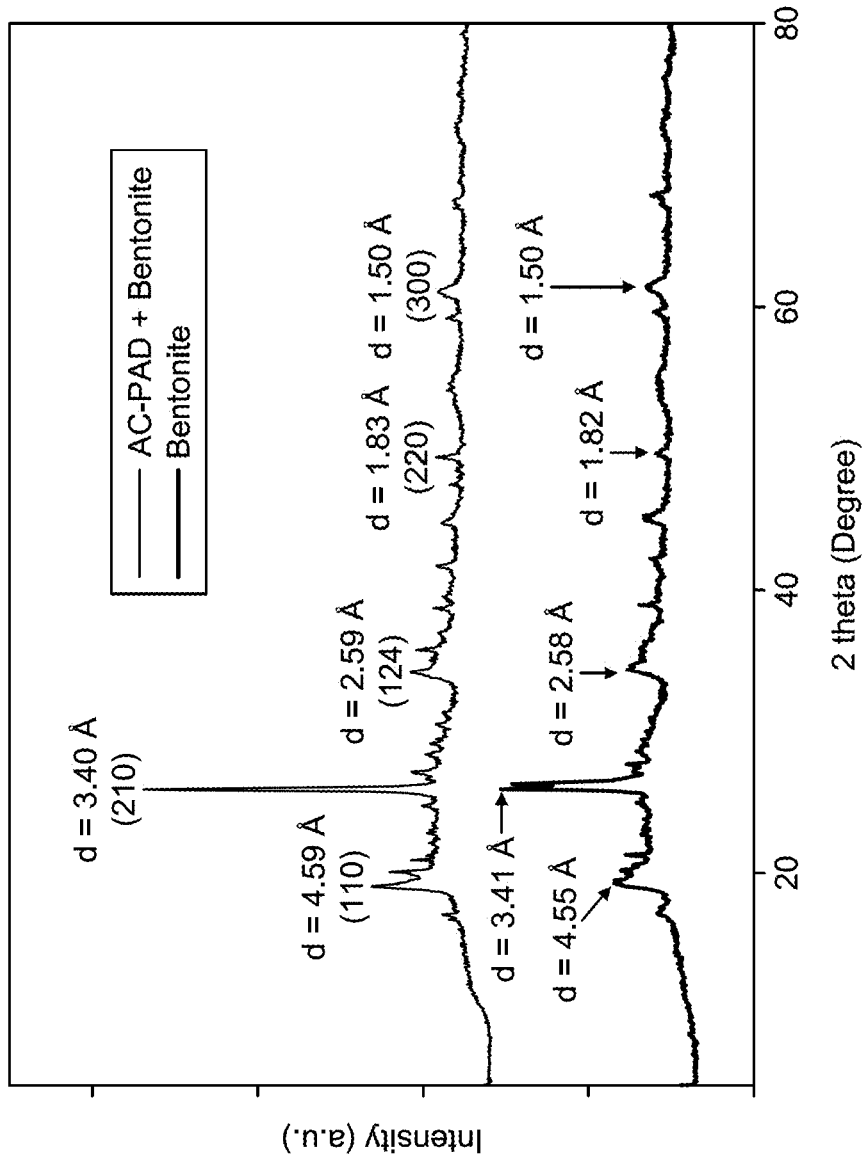
FIG. 7 depicts X-ray diffraction (XRD) data of bentonite and the AC-PAD modified with the AC-PAD, according to certain embodiments.

In some embodiments, the shale material has a first intense peak with a 2 theta (θ) value in a range of 15 to 25° in an X-ray diffraction (XRD) spectrum, a second intense peak with a 2θ value in a range of 25 to 30°, a third intense peak with a 2θ value in a range of 35 to 40°, a fourth intense peak with a 2θ value in a range of 48 to 52°, and a fifth intense peak with a 2θ value in a range of 60 to 65° in the XRD spectrum, as depicted in FIG. 7. In some further embodiments, the AC-PAD-coated clay particles have a first intense peak with a 2 theta (θ) value in a range of 15 to 25° in an X-ray diffraction (XRD) spectrum, a second intense peak with a 2θ value in a range of 25 to 30°, a third intense peak with a 2θ value in a range of 35 to 40°, a fourth intense peak with a 2θ value in a range of 48 to 52°, and a fifth intense peak with a 2θ value in a range of 60 to 65° in the XRD spectrum, as depicted in FIG. 7.

Aspects of the present disclosure are directed towards a method of drilling a subterranean geological formation. The subterranean geological formation may include, but is not limited to, a depleted oil reservoir, a depleted gas reservoir, a sour reservoir, a hydrocarbon bearing subterranean formation, a saline formation, or an un-minable coal bed.

Figure 3:
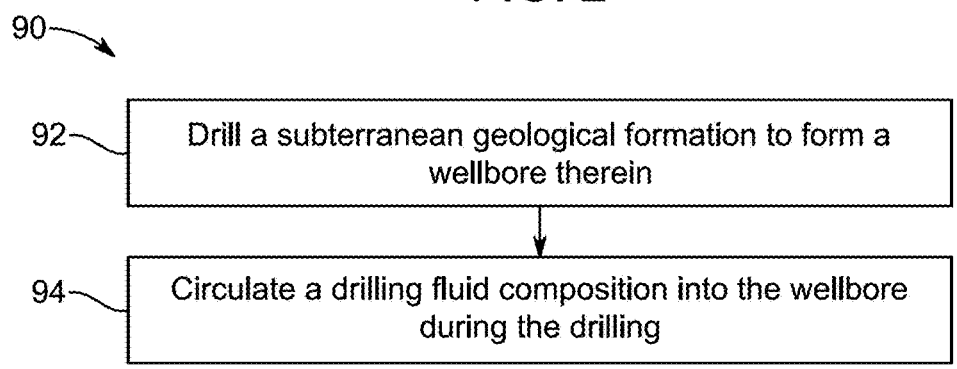
FIG. 3 is a schematic flow diagram of a method of drilling a subterranean geological formation, according to certain embodiments.

Referring to FIG. 3, a schematic flow diagram of a method 90 of drilling the subterranean geological formation is illustrated, according to an embodiment. The order in which the method 90 is described is not intended to be construed as a limitation, and any number of the described method steps may be combined in any order to implement the method 90. Additionally, individual steps may be removed or skipped from the method 90 without departing from the spirit and scope of the present disclosure.

At step 92, the method 90 includes drilling the subterranean geological formation to form a wellbore therein. The subterranean geological formation includes at least one selected from the group consisting of a shale formation, a clay formation, a tar sands formation, a coal formation, and a conventional hydrocarbon formation. In some embodiments, the subterranean geological formation may be drilled by driving a drill bit including, but are not limited to a twist drill, counterbore, countersink and flat bottom boring. In some embodiments, the wellbore is drilled with the drill bit coupled to a motor. In the present disclosure, the wellbore is a portion of an oil well or a gas well, i.e., a borehole, that faces a formation matrix of the subterranean geological formation. In some embodiments, the wellbore includes casing that is made up of one or more metal selected from one or more of stainless steel, aluminum, fiberglass, and titanium. In some embodiments, the wellbore may be a horizontal wellbore, a vertical wellbore, or a multilateral wellbore. The horizontal wellbore may include one or more sections located parallel to a ground surface.

At step 94, the method 90 includes circulating the drilling fluid composition into the wellbore during the drilling. In some embodiments, the drilling fluid is circulated into the subterranean geological formation through the wellbore to maintain a temperature and pressure in the wellbore that is higher than the static pressure of the subterranean geological formation. The wellbore has a temperature of 20 to 300° C., preferably 50 to 250° C., preferably 100 to 200° C., or even more preferably about 150° C. In some further embodiments, the wellbore has a pressure of 50 to 5500 pound-force per square inch (psi), preferably 500 to 5000 psi, preferably 1000 to 4000 psi, preferably 2000 to 3000 psi, or even more preferably about 2500 psi. Other ranges are also possible. In some preferred embodiments, the drilling fluid composition is injected into the subterranean geological formation through the wellbore to maintain a temperature and a pressure in the wellbore that is higher than a static pressure of the subterranean geological formation.

The method 90 may also include recovering a product stream from the subterranean geological formation. In some embodiments, the product stream may include but is not limited to crude oil, natural gas, condensate, propane, butane, naphtha, kerosene, diesel, gasoline, liquified petroleum gas, asphalt, and tar.

The AC-PAD containing drilling fluids demonstrated reduced fluid loss in different proportions at different concentrations and different temperatures. The cake thickness was reduced upon the addition of the AC-PAD. The low fluid loss and thin filter cake make the AC-PAD a useful solution as a fluid loss controller in water-based drilling fluids (WBDFs). Adding the AC-PAD also increased the viscosity and gel strength of the WBDFs.

EXAMPLES

The following examples describe and demonstrate exemplary embodiments of the drilling fluid composition described herein. The examples are provided solely for the purpose of illustration. They are not to be construed as limitations of the present disclosure, as many variations thereof are possible without departing from the spirit and scope of the present disclosure.

Example 1: Methods

Different additives were collected to prepare water-based muds (WBM). KCl was acquired from Beantown chemicals, Hudson, USA. Bentonite for drilling muds was purchased from the Delmon group of companies, Al-Khobar, KSA. Resinex, Xanthan gum (XC) biopolymer, and poly aluminum chloride (PAC-L) were bought from Haliburton, Houston, USA. Sodium sulfite was bought from Sigma Aldrich (USA). Tap water was utilized in all the experimentations. Shale cuttings were collected from one of the Aramco drilling locations and employed to estimate the impression of shale inhibitor on shale integrity. Shale material includes kaolinite, quartz, muscovite, microcline, goethite, gibbsite, and illite and their % composition were 57.0%, 23.0%, 8.9%, 3.8%, 1.2%, 0.7% and 5.7%, respectively [Al-Arfaj, M. K., Hossain, E., Sultan, A., Amanullah, M., Al-Fuwaires, O., Al-Subai, T., 2014. Preliminary Test Results of Inhibitive Water-Based Muds Used to Mitigate Unconventional Shale Drilling Problems, International Petroleum Technology Conference. International Petroleum Technology Conference, which is incorporated herein by reference in its entirety]. All chemicals were employed as obtained without additional refinement.

Example 2: Materials

Activated carbon (AC) was obtained by physical and chemical treatment of palm fibers. Then, the AC was oxidized in the presence of concentrated $HNO_3$ to get carboxylic functionalized AC. To introduce dendrimers to the AC surface, the functionalized AC was added to the mixture of methanol and ethylene diamine and agitated by a magnetic stirrer for 24 h. Afterward, a measured amount of methyl methacrylate was added to the mixture, while maintaining the reaction temperature to 0° C. Later, reaction mixture was stirred at room temperature for 24 h [Ibrahim, M. A., Saleh, T. A., 2021. Synthesis of efficient stable dendrimer-modified carbon for cleaner drilling shale inhibition. J. Environ. Chem. Eng. 9, 104792, which is incorporated herein by reference in its entirety]. The activated carbon functionalized with polyamine dendrimers (AC-PAD) was obtained as a final product that was separated from the solution by ultracentrifugation (5000 rpm), washed with ethanol, and dried overnight in an oven at 40° C.

Example 3: Water-Based Muds Formulation

The WBM was formulated by mixing bentonite clay, Resinex, Xanthan gum biopolymer, polyanionic cellulosic polymer, potassium chloride, tap water, sodium sulfite, and AC-PAD (modifier) in specific quantities mentioned in Table 1. Total volume of 350 milliliters (mL) WBM was obtained, and the AC-PAD-WBM contained 0.85 wt. % of the AC-PAD which is equivalent to the addition of 1.0 LBM to 1.0 barrel (bbl).

TABLE 1

The formulation of WBM with and without AC-PAD shale inhibitor.

| Formulation | Water (ml) | Bentonite (g) | XC-Polymer (g) | Resinex (g) | PAC-L (g) | KCl (g) | $Na_2SO_3$ (g) | Inhibitor (g) |
|---|---|---|---|---|---|---|---|---|
| Unmodified Drilling mud | 281.4 | 5 | 0.8 | 4.5 | 1.5 | 29 | 0.3 | 0 |
| Modified Drilling mud | 281.4 | 5 | 0.8 | 4.5 | 1.5 | 29 | 0.3 | 3 |
| Mixing time (min) | 0 | 5 | 5 | 5 | 5 | 5 | 5 | 10 |

Example 4: Material Characterization

The surface characteristics of the shale material, AC-PAD, and shale modified with the AC-PAD were investigated by Field emission scanning electron microscopy (FE-SEM) (Lyra3) manufactured by TESCAN, Libušina tř. 21 623 00 Brno-Kohoutovice Czech Republic)). The energy-dispersive X-ray spectroscopy (EDX) was employed to approve the existence of elements on the surface of the sample. The functionalities of the synthesized materials were analyzed by a Nicolet 6700 (Thermo Electron Corporation) ((manufactured by Thermo Scientific™, 168 Third Avenue, Waltham, MA, USA 02451)) FT-IR. The stability of the samples was assessed by a Thermogravimetric study (SDT Q 600, TA Instruments, New Castle, DE) and samples were heated up to 800° C. at an increment frequency of 10° C./min with the flow of nitrogen (75 milliliter per minute (mL/min)).

X-ray diffraction (XRD) analysis of the bentonite and its blend with the AC-PAD were studied by the Bruker D2 PHASER benchtop diffractometer. The Cu K$\alpha$ ($\lambda$=0.154 nm) at an operating current of 35 milliampere (mA) and voltage of 45 kilovolts (kV) was considered. Samples were scanned in the 2 theta (2$\theta$) range of 5°-80° at a scan rate of 0.5°/sec. The d-spacing of the samples was analyzed using Bragg's equation (n$\lambda$=2d sin $\theta$; $\lambda$=1.5406 nm; and n=1). For the XRD study, the sample was prepared by mixing 1 gram (g) of bentonite in 100 ml of water and the blend was made by adding 1 wt. % of the AC-PAD to an aqueous solution of bentonite. To get the homogenous mixture, the samples were stirred for 60 minutes. The samples were dried in an oven overnight and ground to powder form for XRD analysis.

Example 5: Shale Inhibition and Swelling Assessment

To evaluate the inhibition capability of the AC-PAD against the bentonite hydration in aqueous phases, the hydration inhibition test has been utilized [Barati, P., Shahbazi, K., Kamari, M., Aghajafari, A., 2017. Shale hydration inhibition characteristics and mechanism of a new amine-based additive in water-based drilling fluids. Petroleum 3, 476-482, which is incorporated herein by reference in its entirety]. Initially, the WBM was formulated as mentioned in Table 1 and introduced to an aging cell. Then the aging cell was hot rolled for 16 h at 100° C. and 500 Psi pressure. Subsequently, the WBM was cooled to room temperature, and the rheology of formulated WBM was analyzed by following the American petroleum institute (API) field testing procedures (American Petroleum Institute, 2019). The rheology assessment was performed at 49° C. by using a rotational viscometer (FANN model 35A instrument company, Houston, USA). Dynamic dial reading at 600 rpm and 300 rpm were noted and used for the calculation of apparent viscosity (AV), plastic viscosity (PV), and yield point (YP) [Dias, F. T. G., Souza, R. R., Lucas, E. F., 2015. Influence of modified starches composition on their performance as fluid loss additives in invert-emulsion drilling fluids. Fuel 140, 711-716; and Rana, A., Arfaj, M. K., Yami, A. S., Saleh, T. A., 2020. Cetyltrimethylammonium modified graphene as a clean swelling inhibitor in water-based oil-well drilling mud. J. Environ. Chem. Eng. 8, 103802, each of which are incorporated herein by reference in its entirety]. The gel strength of the WBM was measured by operating at 600 rpm for 10 seconds(s) and turned off for 10 s and 10 min. Later, the viscometer was switched on to 3 rpm speed, and the maximum dial reading was noted as 10-min gel strength. The API filter press is used to measure the fluid loss. Hydration inhibition capacity of the AC-PAD-WBM was compared with unmodified WBM.

The assessment of shale dispersion can demonstrate critical information about the inhibition features of the WBM. Primarily, to confirm the swelling of shale material, the swelling behavior of shale material in distilled water and the AC-PAD was studied [Zarei, V., Nasiri, A., 2021. Stabilizing Asmari Formation interlayer shales using water-based mud containing biogenic silica oxide nanoparticles synthesized. J. Nat. Gas Sci. Eng. 91, 103928, which is incorporated herein by reference in its entirety]. To measure the amount of water absorbed by the shale, a percent (%) expansion rate test was done. The measured quantity of the dry shale cuttings was submerged in the water and an aqueous solution of shale inhibitor for 24 h. Afterward, the weight of wet shale cuttings was measured to calculate the expansion rate by equation (1).

$$\% \text{ Expansion rate} = \frac{\text{weight of wet sample} - \text{weight of dry sample}}{\text{weight of dry sample}} \times 100; \quad (1)$$

This is a semiquantitative test that demonstrates the comparison of water absorbed by dry shale sample in different aqueous media. The % expansion rate test is helpful for the assessment of the inhibitive capacity of a material. Freshwater is being used as the reference media for comparison. The decrease in the amount of absorbed water by the shale in an aqueous solution indicates the better performance of the shale inhibitor. A mud ball immersion experiment is a simple and intuitive assessment to evaluate the performance of shale inhibitors. A mud ball was prepared by mixing 10 g bentonite with 5 ml of water. Then the mud balls were immersed in 80 ml of distilled water or 1% aqueous solution for 24 h [Chen, G., Yan, J., Lili, L., Zhang, J., Gu, X., Song, H., 2017. Preparation and performance of amine-tartaric salt as potential clay swelling inhibitor. Appl. Clay Sci. 138, 12-16; Zhang, F., Sun, J., Dai, Z., Chang, X., Huang, X., Liu, J., Wang, Z., Lv, K., 2020. Organosilicate polymer as high temperature Resistent inhibitor for water-based drilling fluids. J. Polym. Res. 27, 107; and Zhengqin, Y., Zhongbin, Y., Lei, H., Yun, B., Lili, L., Jie, Z., Chentun, Q., Gang, C., 2018. Preparation and Application of a New Crosslinked Polyammonium as a Shale Inhibitor. J. Appl. Biomater. Funct. Mater. 16, 119-124, each of which are incorporated herein by reference in its entirety]. The immersion state of mud balls was continuously monitored for 24 h and photographed.

The shale material was separated based on size by a sieve shaker between mesh size 1.98 millimeters (mm) and mesh size 4.0 mm. 350 mL WBM containing 3.0 g AC-PAD was mixed with 20 g sorted shale materials. The mixture was added to the aging cell and to mimic wellbore conditions the mixture was hot rolled at 25 rpm and 66° C. for 16 h in rolling oven (OFI testing equipment, Inc. Houston, USA). Later, the cell was kept at room temperature and the mixture was passed through mesh with 0.420 mm and rinsed with water. The remaining shales were desiccated at 105° C. and their weight was measured to calculate the % shale dispersion as shown in equation (2).

$$\% \text{ Shale dispersion recovery} = (W_1 - W_2)/W_1 \times 100; \quad (2)$$

The $W_1$ denotes the initial mass of the shale material, and $W_2$ is the mass of recovered shales after the hot rolling. The % shale dispersion recovery assessment can provide the inhibition capacity of the WBM; however, the inhibition stability test was designed to analyze the long-standing impact of the shale inhibition. The inhibition stability analysis is important to estimate time-dependent inhibition efficiency and wellbore stability issues. The previously inhibited shales obtained from the dispersion analysis were utilized for the inhibition stability test. 5.0 g shale was added up to the aging cell, and 350 mL of fresh water was used as an extremely reactive medium to analyze the durability of inhibition. The mixture was hot rolled for a diverse time duration such as 4, 6, 24, 48, and 72 h. Afterward, the mixture was kept at room temperature for cooling and the mixture was poured into a sieve of mesh size 0.420 mm and rinsed with water. The remaining shale material was dried overnight, and the % shale dispersion recovery was obtained by using equation (2).

The AC-PAD was also engaged in linear swelling test by using a dynamic liner swell meter (OFITE, Inc, Houston, USA). Bentonite pellet was obtained by hydraulic press compression (6000 psi) of 10.0 g bentonite for 30 min. Subsequently, the bentonite pellet was put in linear swelling cup apparatus, and prepared WBM was also added to the apparatus. The bentonite pellet was held for 24 h to assess % linear swelling.

Example 6: Material Characterization

Figure 4A:
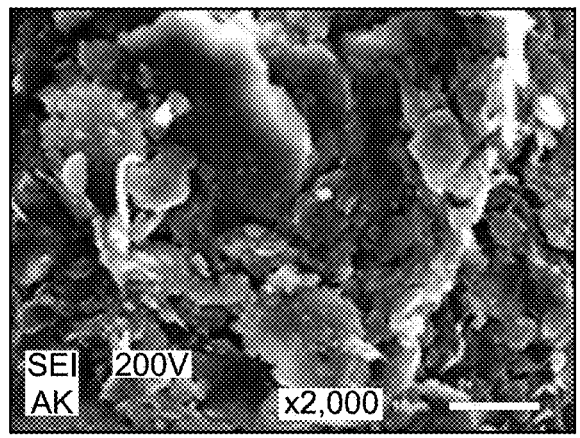
FIG. 4A depicts field emission scanning electron microscopy (FE-SEM) image of shale, according to certain embodiments.
Figure 4B:
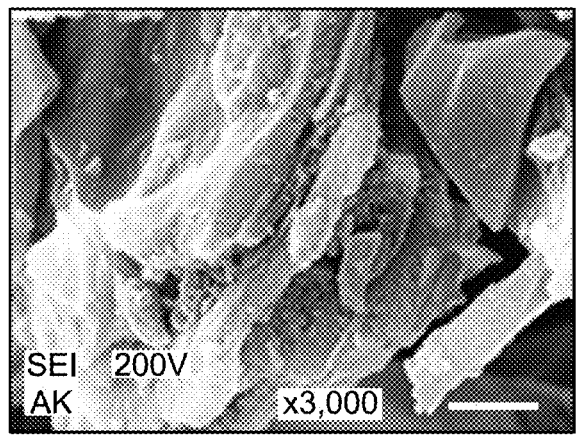
FIG. 4B depicts FE-SEM image of the AC-PAD, according to certain embodiments.
Figure 4C:
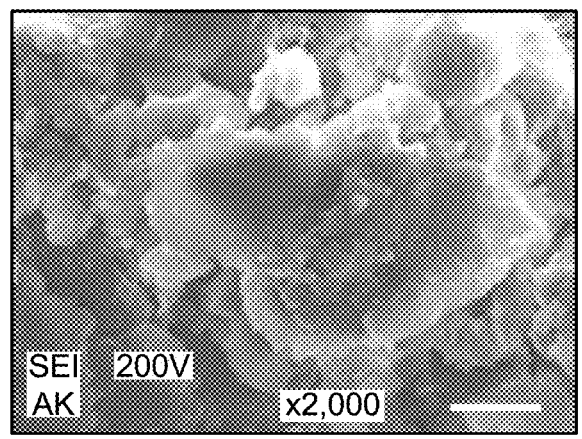
FIG. 4C depicts FE-SEM image of shale modified with the AC-PAD, according to certain embodiments.
Figure 4D:
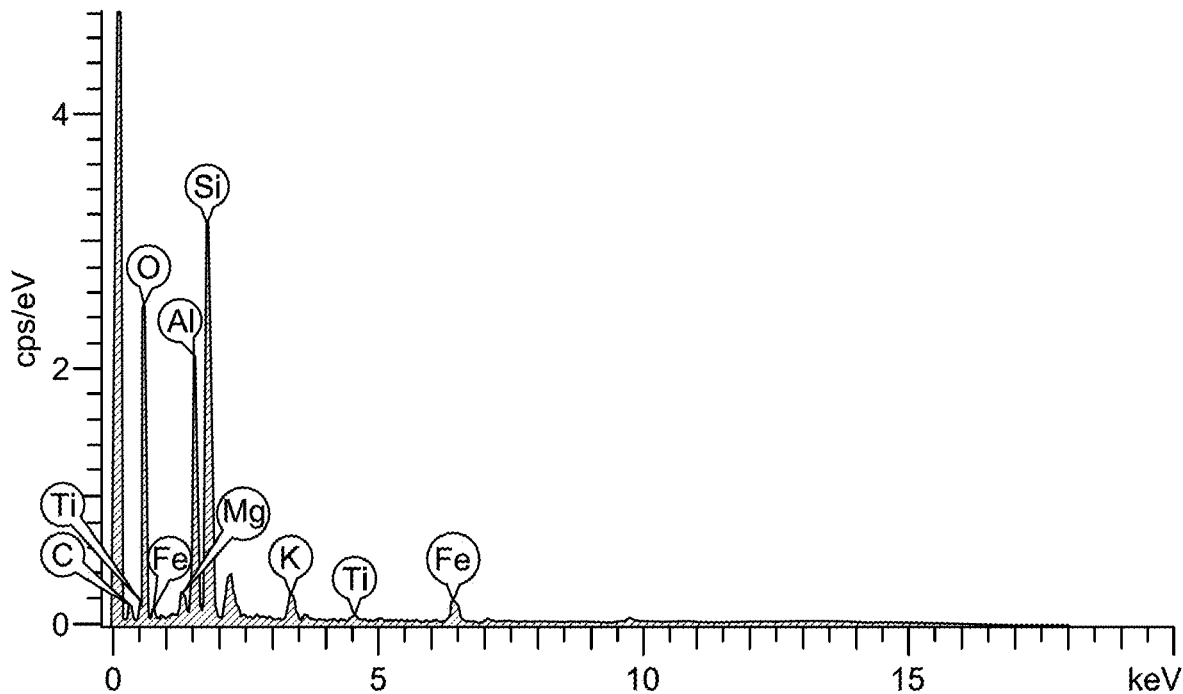
FIG. 4D depicts Energy dispersive X-ray analysis (EDX) spectrum of the shale, according to certain embodiments.
Figure 4E:
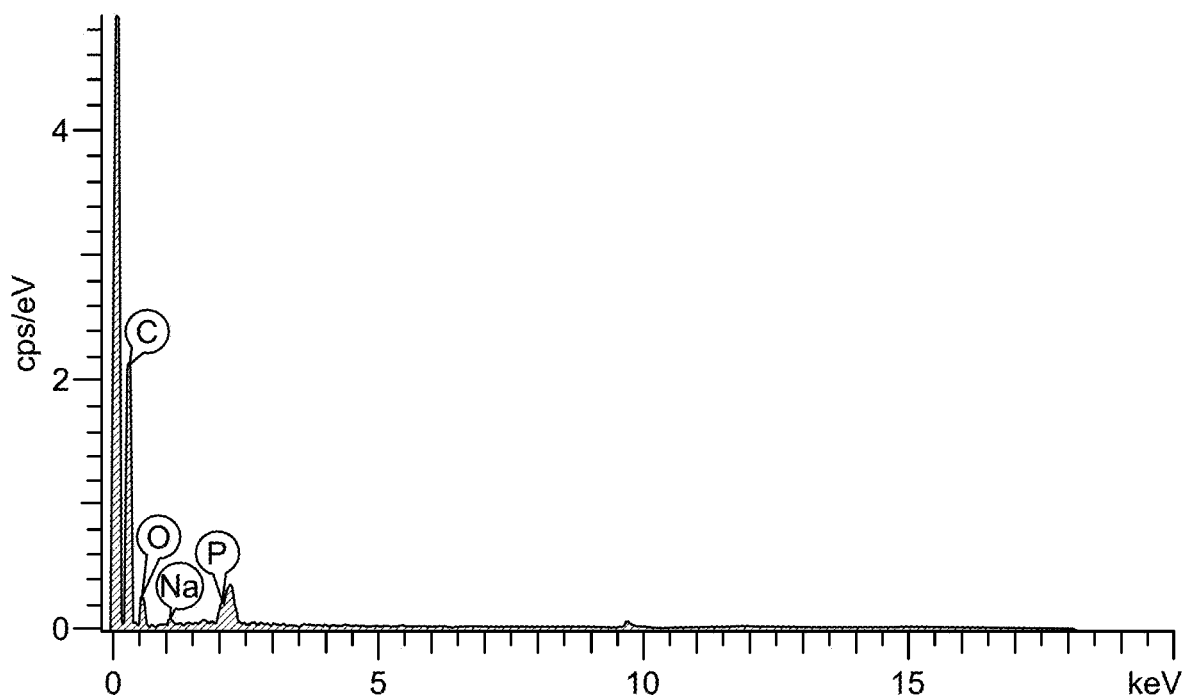
FIG. 4E depicts EDX spectrum of the AC-PAD, according to certain embodiments.
Figure 4F:
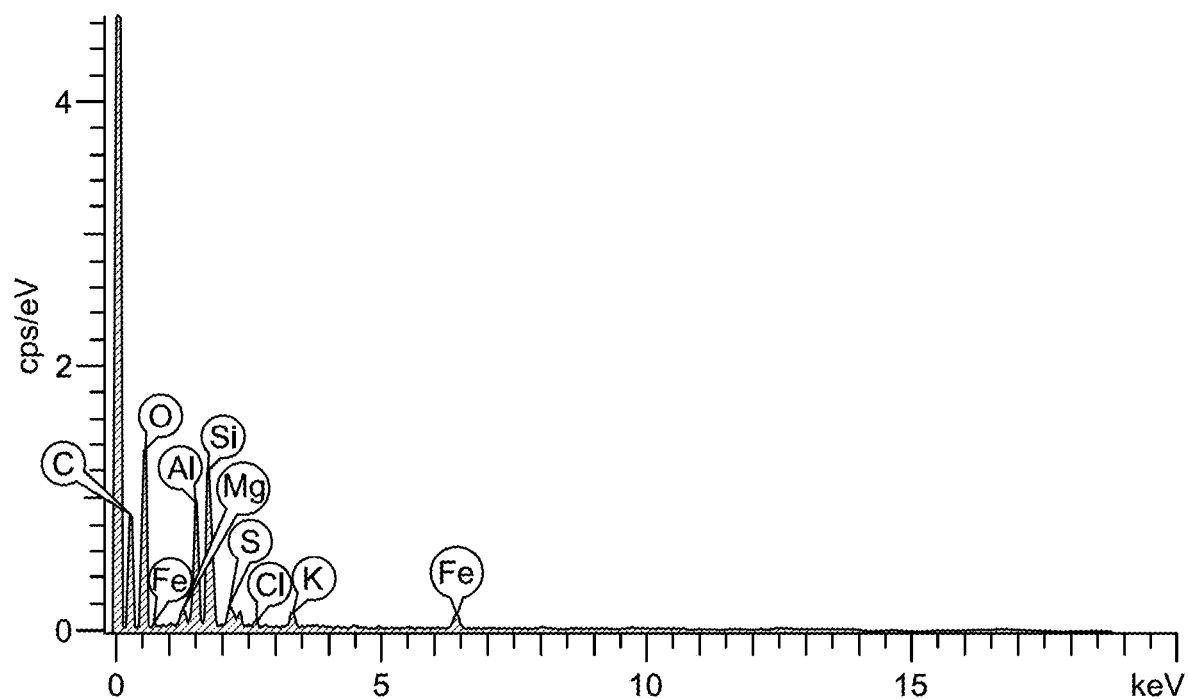
FIG. 4F depicts EDX spectrum of shale modified with the AC-PAD, according to certain embodiments.

The prime target of the present disclosure is to assess the ability of the AC-PAD on the shale inhibition performance of WBM. Therefore, the WBM containing the AC-PAD was formulated and characterization of the shale was done. The field emission scanning electron microscopy (FESEM) images of the shale material before and after the treatment with modified WBM demonstrate prominent variations of shale material. The nanopores are evident on the surface of unmodified shale material (FIG. 4A), additionally, many clay particles can be observed on the surface due to interaction with water. FIG. 4B shows the surface of the AC-PAD material. When shale is treated with the AC-PAD a surface with fewer pores and particles can be observed (FIG. 4C). The EDX spectra of the clay display the major content of oxygen (45.5%), silicon (21.6%), and aluminum (13.0%), along with carbon, iron, magnesium, and potassium (FIG. 4D). The EDX composition is similar to the values reported [Keykha, H. A., Huat, B. B. K., Asadi, A., 2014. Electrokinetic Stabilization of Soft Soil Using Carbonate-Producing Bacteria. Geotech. Geol. Eng. 32, 739-747; and Sharma, R., Patel, K. S., Lata, L., Milosh, H., 2016. Characterization of Urban Soil with SEM-EDX. Am. J. Anal. Chem. 07, 724-735, each of which are incorporated herein by reference in its entirety]. The EDX of the AC-PAD shows carbon and oxygen as the chief constituents (FIG. 4E). The AC-PAD modified shale reveals a prominent increase in carbon content and a decrease in oxygen and silicon percentage on a clay surface that confirms the binding of the AC-PAD to the shale (FIG. 4F).

The FT-IR analysis of the material samples can help to assess the structural characteristics and water repellent capacity (FIG. 5). In the FT-IR spectra of the AC-PAD, a characteristic stretching vibration band of —OH appeared at 3430-centimeter inverse ($cm^{-1}$). The peak at $1600 \ cm^{-1}$ can be attributed to the N—H bending vibration of —NH$_2$ [Hu, L., Yang, Z., Wang, Y., Li, Y., Fan, D., Wu, D., Wei, Q., Du, B., 2017. Facile preparation of water-soluble hyperbranched polyamine functionalized multiwalled carbon nanotubes for high-efficiency organic dye removal from aqueous solution. Sci. Rep. 7, 3611, which is incorporated herein by reference in its entirety]. Absorption bands between 2900-500 $cm^{-1}$ are very crucial in the estimation of the moisture content of the material. The spectra of shale material exhibit the strongest —OH absorption band that demonstrate the great affinity of the shale material towards the moisture content [Oliveira, C. I. R. de, Rocha, M. C. G., Silva, A. L. N. da, Bertolino, L. C., 2016. Characterization of bentonite clays from Cubati, Paraíba (Northeast of Brazil). Cerâmica 62, 272-277, which is incorporated herein by reference in its entirety]. The characteristic stretching peaks of Si—O and Si—O—Al bending due to octahedral layers of aluminosilicates were also observed [Louati, S., Baklouti, S., Samet, B., 2016. Geopolymers Based on Phosphoric Acid and Illito-Kaolinitic Clay. Adv. Mater. Sci. Eng. 2016, 1-7, which is incorporated herein by reference in its entirety]. The detailed analysis of shale spectra revealed that kaolinite makes up the major portion of shale material [Diko, M., 2015. Fourier transform infrared spectroscopy and thermal analyses of kaolinitic clays from South Africa and Cameroon. Acta Geodyn. Geomater. 1-10, which is incorporated herein by reference in its entirety]. The plugging and surface binding of the AC-PAD with shale material enhances the hydrophobic character and there was observed a prominent decrease of —OH stretching peak area of AC-PAD-Shale. These outcomes demonstrate that the addition of the AC-PAD enhances the hydrophobic character of the shale material which can be helpful towards the stability of shale during the drilling process.

TGA provides a hint about mass loss and temperature ratio as an indication of the shale inhibitor's stability. FIG. 6 shows the TGA study of the AC-PAD displayed that 16% of its initial mass was lost up to 200° C. The major mass loss can be attributed to the elimination of hydration water from AC-PAD [Ren, T., Li, L., Cai, X., Dong, H., Liu, S., Li, Y., 2012. Engineered polyethylenimine/graphene oxide nanocomposite for nuclear localized gene delivery. Polym. Chem. 3, 2561, which is incorporated herein by reference in its entirety]. Afterward, between 200° C.-600° C., 30% of AC-PAD mass loss was detected due to pyrolysis of physisorbed and covalently bounded PAD molecules. Eventually, at 800° C. the 41% AC-PAD residue was found. The water-bound physically to the aluminosilicate layers or to the interlayer cations is a crucial factor in determining the mass loss up to 200° C. [Njoka, E. N., Ombaka, O., Gichumbi, J. M., Kibaara, D. I., Nderi, O. M., 2015. Characterization of clays from Tharaka-Nithi County in Kenya for industrial and agricultural applications. African J. Environ. Sci. Technol. 9, 228-243, which is incorporated herein by reference in its entirety]. The initial mass loss is called dehydration which is vital to determine the clay reactivity towards the surrounding moisture. It was observed that the shale sample lost 10.5% of its initial mass due to dehydration. However, the AC-PAD-shale displayed better stability, and only 3.5% mass loss was observed due to dehydration. Till 800° C. the shale and the AC-PAD-shale display total mass loss of 27% and 17.5% respectively. The outcomes of the TGA assessment confirm the stability of the AC-PAD-shale composite over a wide range of temperature and less hydrophilic character that is vital for the integrity of the wellbore during the drilling operation.

The XRD patterns for the pure bentonite and the AC-PAD modified bentonite are shown in FIG. 7. Characteristic peaks at diffraction angle, 2θ=19.47°, 26.05°, 34.68°, 49.79°, and 61.56° corresponds to the planes (110), (210), (124), (220), and (300) of the bentonite clay [Hebbar, R. S., Isloor, A. M., Prabhu, B., Inamuddin, Asiri, A. M., Ismail, A. F., 2018. Removal of metal ions and humic acids through polyetherimide membrane with grafted bentonite clay. Sci. Rep. 8, 4665; and Schütz, T., Dolinská, S., Mockovčiaková, A., 2013. Characterization of Bentonite Modified by Manganese Oxides. Univers. J. Geosci. 1, 114-119, each of which are incorporated herein by reference in its entirety]. The XRD data demonstrate that there is no prominent change either in the peak intensity, peak shift, or d-spacing of bentonite clay after modification with the AC-PAD. Therefore, it can be inferred that there is no significant variation in the phase structure of bentonite after the AC-PAD addition.

Example 7: Shale Inhibition and Swelling Assessment of AC-PAD

TABLE 2

Hydration inhibition test results at 49° C. and 14.7 psi

| Muds Formulation | PV (cp) | AV (cp) | YP (lb/ft$^2$) | Gel 10 sec (lb/ft$^2$) | Gel 10 min (lb/ft$^2$) | Fluid loss (mL) |
| --- | --- | --- | --- | --- | --- | --- |
| Unmodified muds Pre hot rolling | 12 | 20.5 | 8.5 | 8.1 | 15.1 | 10.5 ml |
| Unmodified muds Post hot rolling | 10.1 | 18.3 | 8.2 | 6.7 | 9.5 | 11.4 ml |
| AC-PAD-WBM Post hot rolling | 9.5 | 17.7 | 8.4 | 5.9 | 7.6 | 10.3 ml |

The rheological properties of the AC-PAD-WBM were related to the unmodified WBM. The formulation includes the base fluid and 0.85 wt. % of the shale inhibitor. The assessment of the rheological features was done to observe the consequence of shale inhibitors on the WBM. Table 2 demonstrates the various rheological properties of the drilling fluid studied at 49° C. and 14.7 psi. The results disclosed that the unmodified muds and AC-PAD-WBM after hot rolling display a minor decrease in the rheological characteristics such as apparent viscosity (AV), plastic viscosity (PV), yield point (YP), and gel strength. The minute fall in the rheological characteristics of the WBM can be accredited to the decomposition of the biopolymer at high temperatures. However, the rheological features of both muds remain almost the same and there is no prominent change was observed. Although, the filtration loss of the AC-PAD-WBM was decreasing prominently as compared to unmodified muds. Consequently, it can be concluded that the AC-PAD can be introduced to the WBM without any variation in the rheology and better fluid loss control of the WBM.

Figure 8A:
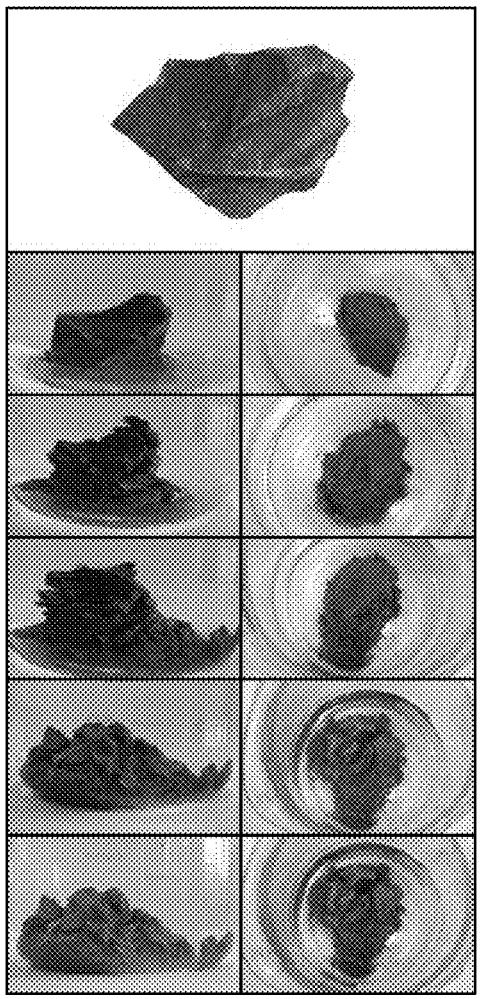
FIG. 8A depicts images showing time-dependent shale swelling behavior of the shale cutting in water, according to certain embodiments.
Figure 8B:
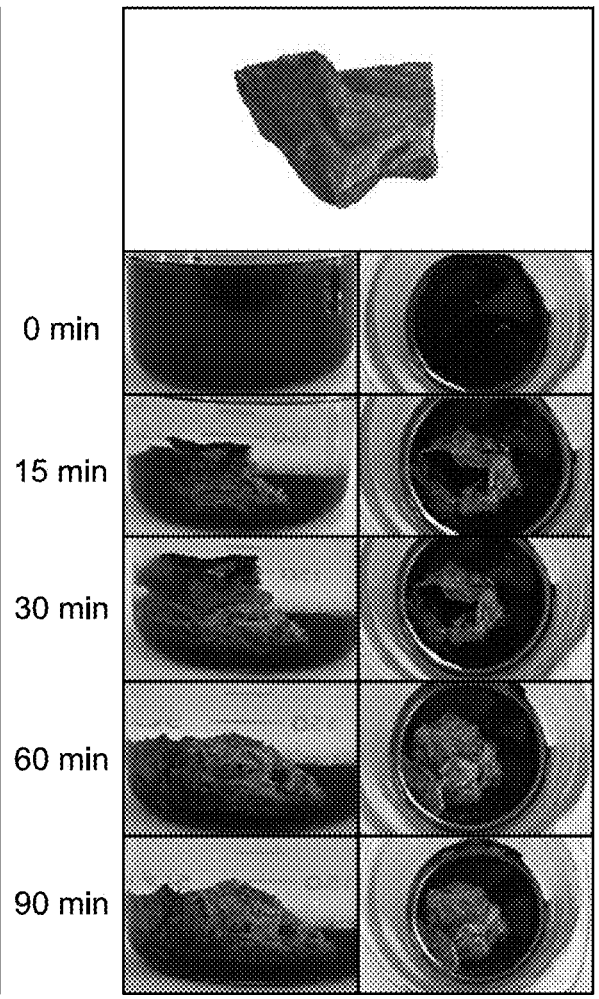
FIG. 8B depicts images showing time-dependent shale swelling behavior of the shale cutting in the AC-PAD, according to certain embodiments.

FIGS. 8A-8B describes the effect of the AC-PAD on the shale swelling. The time-dependent study was done to prove the shale inhibition behavior of the AC-PAD. Shale cuttings (FIG. 8A and FIG. 8B) were separately immersed in the water and 1% AC-PAD solution to observe the shale swelling phenomenon. Images were captured after a specific duration. The image of shale cutting soaked into the water displayed a well-defined shape of shale, however, due to the dispersed nature of the AC-PAD the shale cutting is not visible. After 15 min the water molecules invaded the shale and the shale sample started to swell due to water uptake by clay minerals such as illite and chlorite. On the other hand, the shale dipped in the AC-PAD solution showed less swelling and the surface of the shale covered with the AC-PAD is also visible. As time passed, the invading water molecules started disintegration and dispersion of the shale soaked in water due to a prominent decrease in mechanical durability. Greater shale swelling was observed for the shale dipped in water and the dispersed small shale particles are also evident. However, the shale sample present in the AC-PAD solution displayed resistance against wear and tear of water and most of the structure remains integral. The outcomes confirmed the swelling inhibition capability and proved the AC-PAD as a potential candidate for the shale inhibitor.

To assess the inhibiting effect of the AC-PAD, the expansion rate of shale material was measured. The increase in the weight of the shale is due to the amount of water absorbed by the shale over a period of 24 h. Table 3 demonstrates the outcomes of the conducted tests.

TABLE 3

% Expansion rate assessment of shale material in water and the aqueous solution of AC-PAD.

| Fluid used | Concentration % by volume | Experiment temperature | Dry Shale sample weight (g) | Wet shale sample weight after 20 h (g) | % Expansion rate |
| --- | --- | --- | --- | --- | --- |
| Water | 0 | 25° C. | 1.56 | 1.67 | 7.05 |
| Water | 0 | 65° C. | 1.13 | 1.32 | 16.81 |
| AC-PAD | 0.01 | 25° C. | 1.52 | 1.57 | 3.29 |
| AC-PAD | 0.01 | 65° C. | 1.14 | 1.26 | 10.53 |

Figure 9:
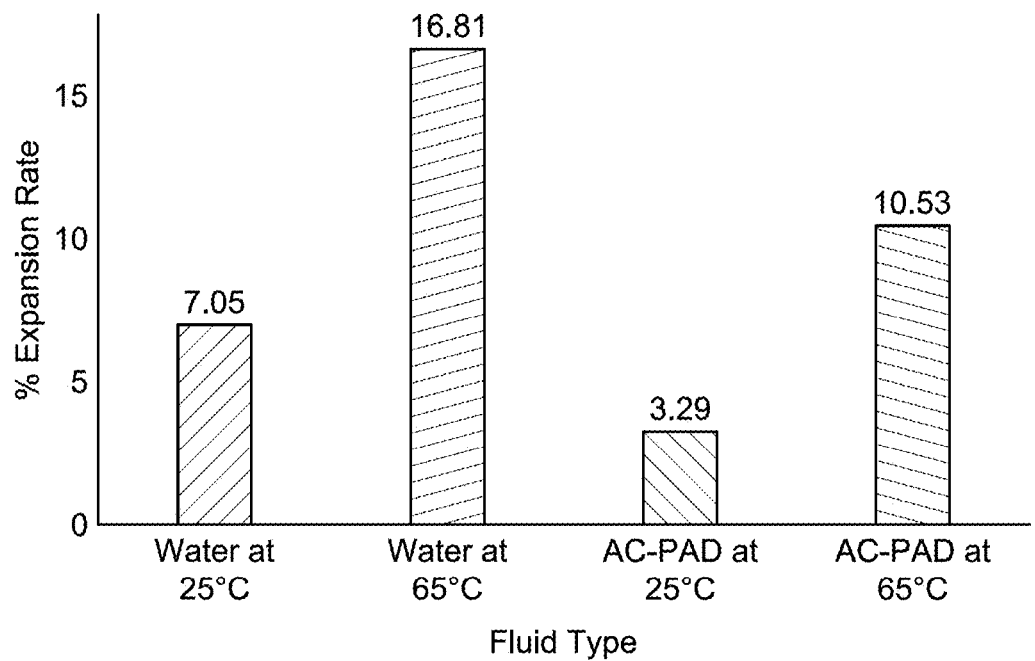
FIG. 9 depicts % expansion rate of the shale in water and the AC-PAD, according to certain embodiments.

The results revealed that the AC-PAD plays a crucial role in reducing the amount of absorbed water at different temperatures (FIG. 9). The shale cutting displayed a high expansion rate in water at room temperature and 65° C., i.e., 7.05% and 16.81% respectively. A prominent decrease in expansion rate was observed after the immersion of shale cutting in the 1% aqueous solution of the AC-PAD. The expansion rate of shale cuttings in the AC-PAD was observed to be 3.28% and 10.52% at room temperature and 65° C., respectively. The outcomes confirmed the inhibitive behavior of the AC-PAD, and the shale material was protected against the reactive action of water.

FIG. 10A-FIG. 10B displayed the outcomes of mud ball immersion tests. FIG. 10A shows the captured photographs of mud ball control immersed in distilled water for 24 h. FIG. 10B demonstrates the mud ball immersed in 1% AC-PAD inhibitory solution for 24 h. After 2 h of immersion, the mud balls showed completely different behavior in water and inhibitory solution. The mud-ball in water displayed higher swelling and dispersion of bentonite. However, the mud-ball surface covered with the AC-PAD can be observed, and no dispersion of bentonite clay is evident. After 24 h, the mud-ball is completely hydrated in water that increased its size prominently and a distorted shape can be observed. On the other hand, the mud ball immersed in 1% AC-PAD solution displayed less swelling and dispersion. Additionally, no shape distortion of the mud ball can be observed. Therefore, it can be concluded that the AC-PAD coat the surface of the mud sphere and make the surface hydrophobic and slowed down the hydration of clay.

Figure 11A:
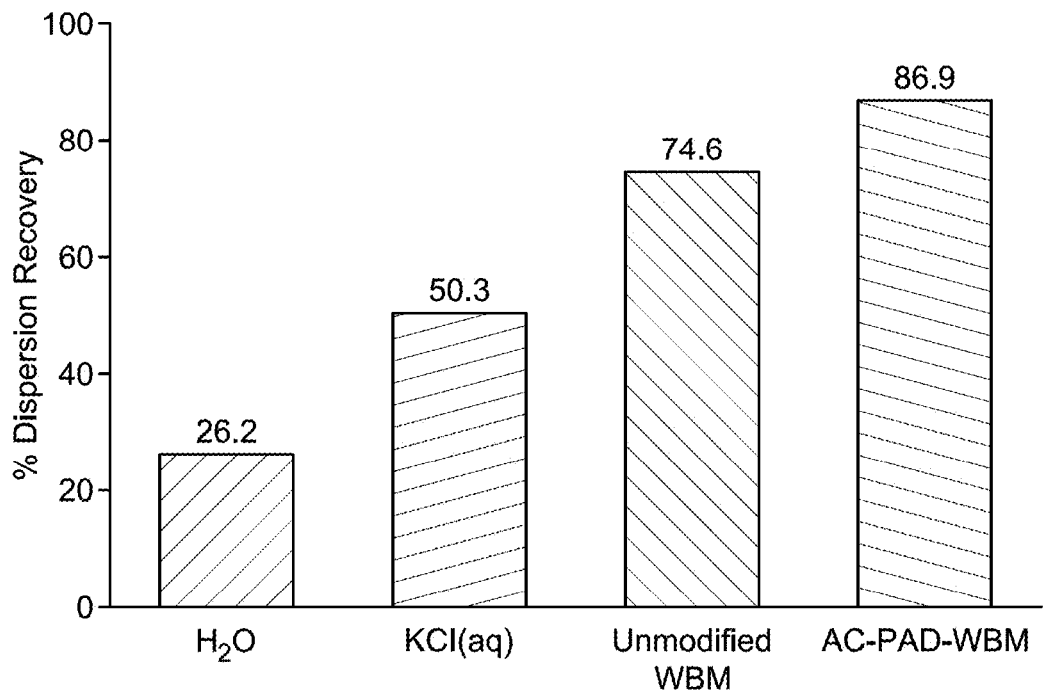
FIG. 11A depicts a dispersion test of the shale in the presence of $H_2O$, $KCl_{(aq)}$, unmodified water-based muds (WBM), and AC-PAD modified water-based muds (AC-PAD-WBM), according to certain embodiments.

The chemical integrity of the shale material in the presence of WBM was assessed by dispersion recovery, inhibition stability, and linear swelling analysis. The dispersion recovery test is crucial to assess the disintegration and erosion of the shale cutting due to contact with WBM. The shale dispersion is impacted by numerous reasons such as the physical and chemical features of shale, and the wellbore conditions. The amount of the shale cuttings obtained after the dispersion test is an indication of inhibition capacity induced by the WBM. Initially, the shale was hot rolled with water to have an idea of the reaction of water over the structural integrity of shale (FIG. 11A). The outcomes demonstrated that a quarter of the shale was lost due to hot rolling in the highly reactive medium. Then the aqueous solutions of the shale inhibitors were used to observe their impact on shale recovery. Firstly, the shale cuttings were treated with an aqueous solution of 0.85 wt. % KCl, almost half of the shale material was dispersed after hot rolling. Though, the shale recovery shoots up to 74.6% when shale was treated with unmodified WBM. The increase in recovery can be attributed to the high salt concentration of WBM that protects the shale against the reactive action of water. While the addition of the AC-PAD (0.85 wt. %) prominently enhanced the shale recovery up to 86.9%. The improvement in the amount of recovered shale material can be accredited to the attachment of the AC-PAD with the shale to block the access of water to the shale. The dispersion recovery study confirmed the improvement in inhibition capacity of WBM after the addition of the AC-PAD as related to other additives.

Figure 11B:
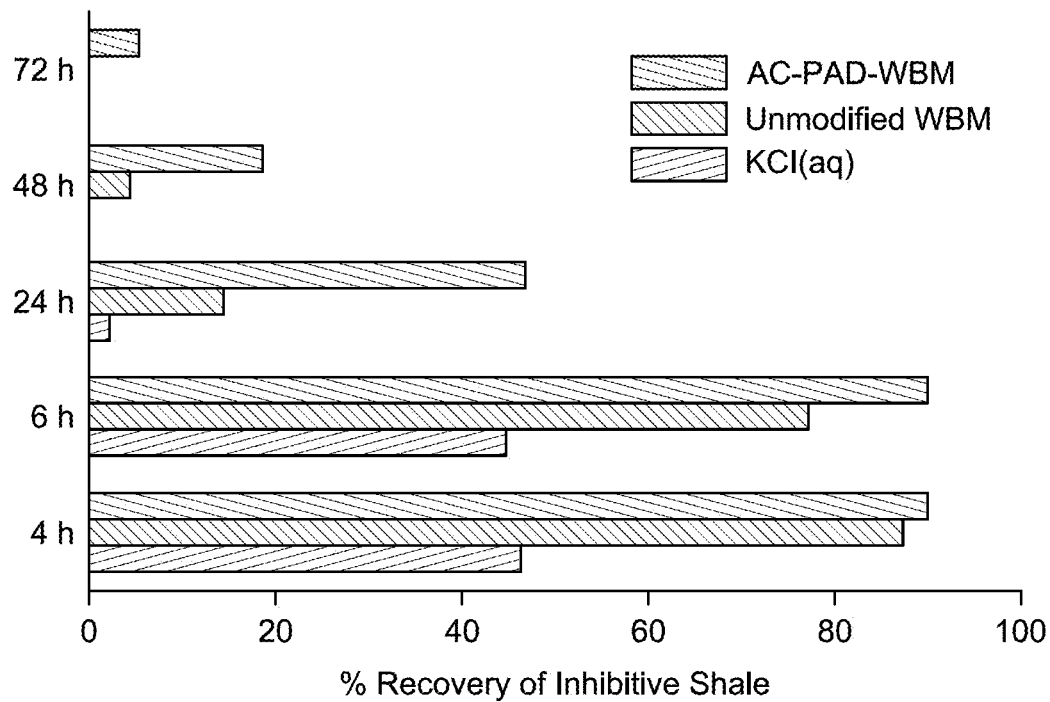
FIG. 11B depicts an inhibition stability of the shale in the presence of $H_2O$, the $KCl_{(aq)}$, the unmodified WBM, and the AC-PAD-WBM, according to certain embodiments.

The dispersion recovery analysis provided an efficient estimate of the inhibition capacity of the WBM. However, it is incapable to evaluate the time-dependent strength of the shale material. Therefore, the estimation of time-based inhibition stability is crucial [Al-Arfaj, M. K., Amanullah, M., Mohammed, A.-O., 2018. An Enhanced Experimental Method to Assess the Shale Inhibition Durability of Inhibitive Water-Based Drilling Fluids, in: SPE/IADC Middle East Drilling Technology Conference and Exhibition. Society of Petroleum Engineers; and Rana, A., Saleh, T. A., Arfaj, M. K., 2019. Improvement in Rheological Features, Fluid Loss and Swelling Inhibition of Water-Based Drilling Mud by Using Surfactant-Modified Graphene, Abu Dhabi International Petroleum Exhibition & Conference. Society of Petroleum Engineers, each of which are incorporated herein by reference in its entirety]. FIG. 11B demonstrated the inhibition stability analysis of the inhibited shale in water for diverse periods. The outcomes revealed that the $KCl_{(aq)}$ treated shale started to disintegrate even after 4 h and just half of the shales were recovered. While the unmodified WBM treated shales displayed more effective defense and stayed stable up to 6 h. However, after 24 h most of the shale was lost due to the reactive action of invading water molecules that damage the shale structure and started structure collapse. Finally, the AC-PAD-WBM treated shales showed outstanding resistance against water. In the beginning, 90% of shales were obtained after 6 h. Though the reactive medium starts to invade the shale surface, and shale swelling and damage start. Therefore, nearly half of the shale cuttings remain resistant to the reactive action of the water after one day. The shale loss frequency increase with time. Subsequently, after 48 h a huge amount of shale i.e., 60% was lost. The stability evaluation demonstrated that shales treated with the AC-PAD-WBM were stable for a longer time as related to $KCl_{(aq)}$ or unmodified WBM treated shale.

Figure 12:
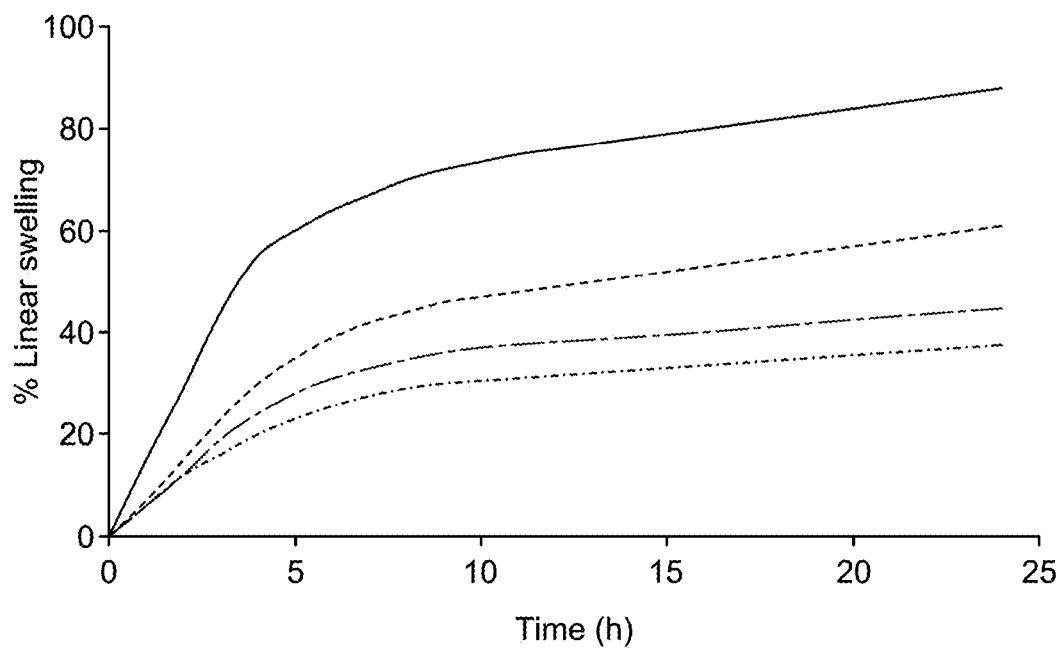
FIG. 12 depicts a linear swelling test of bentonite in the presence of $H_2O$, the $KCl_{(aq)}$, the unmodified WBM, and the AC-PAD-WBM, according to certain embodiments.

To evaluate the swelling control ability of the AC-PAD-WBM, the linear swelling frequency was assessed. The diverse swelling mediums were utilized to acquire an efficient evaluation of their inhibition capability as shown in FIG. 12. The bentonite clay demonstrated the maximum swelling in the water, i.e., 88%. On the other hand, the unmodified WBM displayed a prominent drop in the linear swelling due to the presence of a high concentration of inhibitive salts. Afterward, shale inhibitors (2%) were added to the WBM to observe the effect of the inhibition materials. The results disclosed that the $KCl_{(aq)}$ prominently affected the linear swelling of bentonite and decrease it to 40%. The AC-PAD produced spectacular control on the bentonite swelling and reduced it by 50% as related to water, 23% as related to unmodified WBM, and 8% as related to KCl. Finally, the linear swelling tests established the outstanding swelling inhibition capacity of the AC-PAD-WBM.

Figure 13:
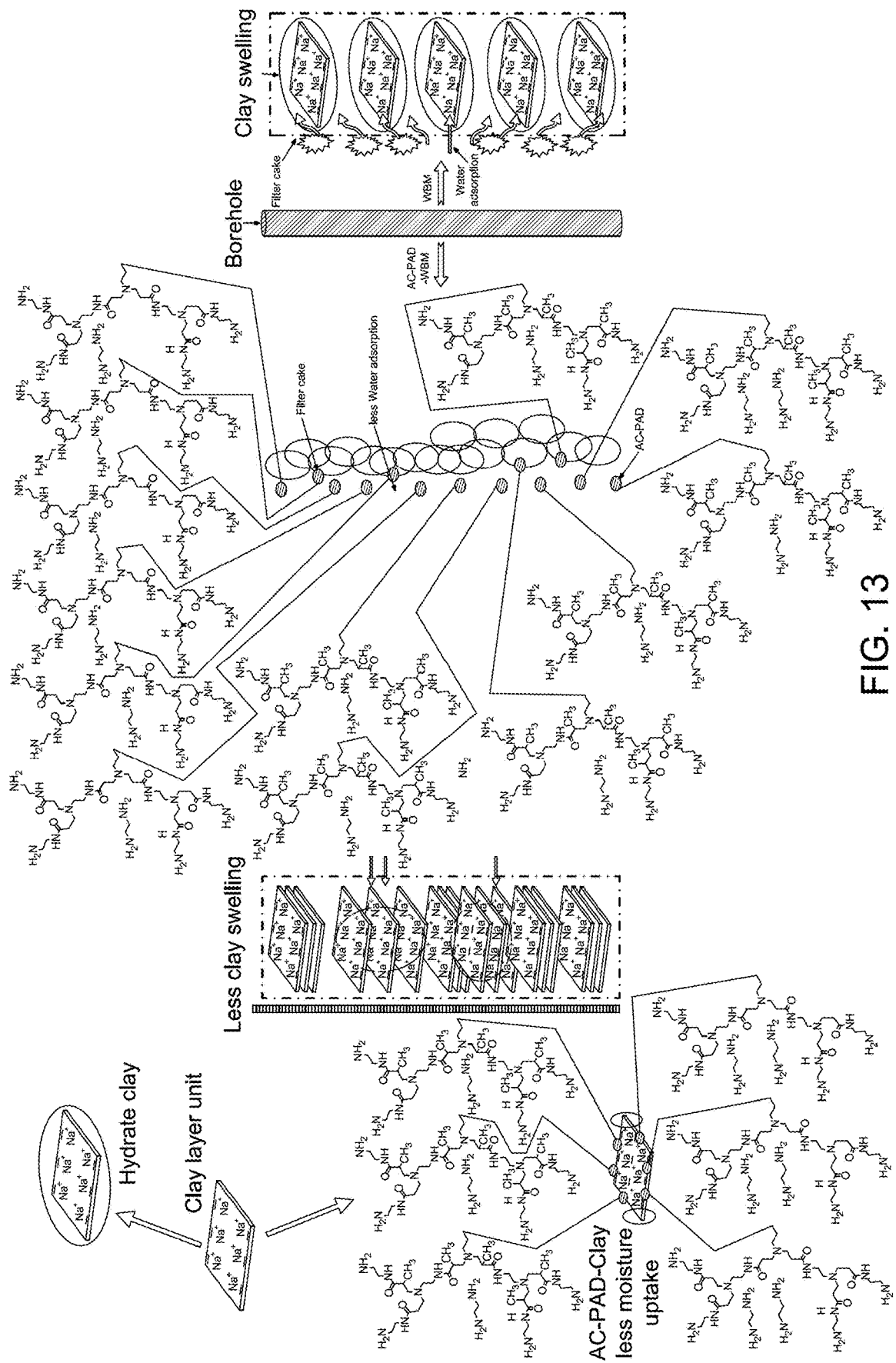
FIG. 13 is a schematic inhibition mechanism of the AC-PAD-WBM, according to certain embodiments.

A possible scheme of inhibition mechanism discussing the interaction of the AC-PAD and clay is demonstrated in FIG. 13. When clay material is exposed to the aqueous medium, crystalline, and osmotic swelling occur. The hydration of interlayer spacing of the clay resulted in the expansion of clay layers causing swelling [Arfaj, M. K., Rana, A., Saleh, T. A., 2020. Highly Efficient Modified Activated Carbon as Shale Inhibitor for Water Based Drilling Mud Modification, Abu Dhabi International Petroleum Exhibition & Conference. Society of Petroleum Engineers; Rana, A., Arfaj, M. K. M. K., Saleh, T. A. T. A., 2019. Advanced developments in shale inhibitors for oil production with low environmental footprints-A review. Fuel 247, 237-249; and Saleh, T. A., Rana, A., Arfaj, M. K., 2020. Graphene grafted with polyethyleneimine for enhanced shale inhibition in the water-based drilling fluid. Environ. Nanotechnology, Monit. Manag. 100348, each of which are incorporated herein by reference in its entirety]. The outcomes obtained from the material characterization techniques and shale inhibition studies demonstrated an improvement in inhibition performance after the addition of AC-PAD. The SEM images displayed a shale surface with fewer pores in the presence of the AC-PAD as compared to unmodified shale. The polyamine dendrimer is attached to the surface of the activated carbon. When the AC-PAD is dispersed in an aqueous medium the amine functional groups get protonated to the ammonium cations. These cations help to bind the AC-PAD to the clay surface through electrostatic forces and hydrogen bonding and less hydration and clay swelling occurs. On the other hand, the cationic PAD also helps to block the nanopores by attaching to the negatively charged shale surface in microfractures and nanopores. The plugging of nanopores prominently reduces the water invasion as observed in FT-IR and TGA analysis. Additionally, the blocking of nanopores causes less disintegration and swelling as observed in shale inhibition and swelling control tests. The application of the AC-PAD displayed the chemical inhibition and physical plugging with a synergy that helped to prominently meliorate the shale inhibition stability and swelling control.

In the present disclosure, the better inhibition features of the AC-PAD were demonstrated. The AC-PAD blocks the nanopores of the shale and hinders the water molecules to invade the surface. Subsequently, the surface of the shale becomes hydrophobic which protects it from the destruction of water. The addition of the AC-PAD to the WBM caused the highest recovery i.e., 86.9%. However, less dispersion test recoveries in unmodified WBM (74.6%), $KCl_{(aq)}$ (50.3%), and water (26.2%) were observed. The inhibition stability test of the AC-PAD-WBM established stability up to 24 h. The study of rheological properties disclosed that the addition of the AC-PAD helps to maintain the properties of WBM at a higher temperature.

Numerous modifications and variations of the present disclosure are possible in light of the above teachings. It is therefore to be understood that within the scope of the appended claims, the invention may be practiced otherwise than as specifically described herein.

The invention claimed is:

1. A method of drilling a shale formation, the method comprising:
   drilling the subterranean geological formation to form a wellbore therein; and
   injecting a drilling fluid composition into the wellbore during the drilling,
   wherein during the injecting the drilling fluid composition is circulated in the wellbore at a pressure that is higher than the static pressure of the shale formation:
   wherein the drilling fluid composition comprises:
   an aqueous base fluid;
   0.01 to 5 wt. % of polyamine-functionalized activated carbon (AC-PAD);
   0.1 to 10 wt. % of a shale material;
   0.01 to 2 wt. % of a thickener;
   0.1 to 10 wt. % of a fluid loss control additive;
   0.01 to 5 wt. % of an adsorbent; and
   1 to 20 wt. % of a borehole stabilizer;
   wherein each wt. % is based on a total weight of the drilling fluid composition;
   wherein the AC-PAD is uniformly disposed on surfaces of the shale material; and
   wherein the shale material has an average pore size of 5 to 400 nanometers (nm).

2. The method of claim 1, wherein the AC-PAD molecules in the drilling fluid composition are in the form of dendrimers having a plurality of at least one repeating unit selected from the group consisting of

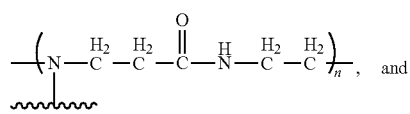

, and

-continued

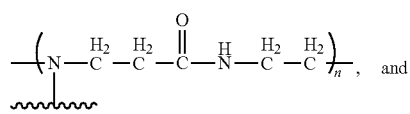

, and wherein n is any integer from 1 to 100 inclusive.

3. The method of claim 1, wherein each of the AC-PAD molecules of the drilling fluid composition comprises a carboxylic acid-functionalized activated carbon core and a plurality of polyamidoamine branch structures, and wherein at least one carboxyl group of the activated carbon core is covalently bonded to at least one amine group of at least one of the polyamidoamine branch structures.

4. The method of claim 1, wherein the shale material of the drilling fluid composition comprises at least one clay selected from the group consisting of sodium bentonite, calcium bentonite, potassium bentonite, sodium montmorillonite, and calcium montmorillonite.

5. The method of claim 1, wherein the shale material of the drilling fluid composition comprises 50 to 65 wt. % kaolinite, 15 to 35 wt. % quartz, 5 to 15 wt. % muscovite, 1 to 8 wt. % microcline, 0.1 to 3 wt. % goethite, 0.1 to 3 wt. % gibbsite, and 1 to 10 wt. % illite based on the total weight of the shale material.

6. The method of claim 1, wherein the aqueous base fluid comprises one or more selected from the group consisting of a foaming agent, a gelling agent, a pH control agent, a breaker, an oxidizing breaker, a gel stabilizer, a clay stabilizer, a corrosion inhibitor, a crosslinking agent, a scale inhibitor, a catalyst, a preservative, a biocide, and a thermal stabilizer.

7. The method of claim 1, wherein the thickener of the drilling fluid composition comprises at least one selected from the group consisting of xanthan gum, guar gum, corn starch, gelatin, and a cellulosic thickener.

8. The method of claim 1, wherein the fluid loss control additive comprises at least one selected from the group consisting of lignite, cellulose, and hemicellulose.

9. The method of claim 1, wherein the adsorbent of the drilling fluid composition comprises poly aluminum chloride having a formula $[Al_2(OH)_nCl_{6-n}]_m$, wherein $1 \leq n \leq 5$, and $0 < m \leq 10$.

10. The method of claim 1, wherein the borehole stabilizer of the drilling fluid composition comprises at least one selected from the group consisting of sodium sulfite ($Na_2SO_3$) and potassium chloride (KCl).

11. The method of claim 1, wherein the drilling fluid composition has a pH in a range of 8 to 10.

12. The method of claim 1, wherein the drilling fluid composition has a shale material expansion rate of 1 to 15%, and a shale dispersion recovery rate of 75 to 95%, each based on an initial weight of the shale material, as determined by American Petroleum Institute (API) standard procedures (API, 2019).

13. The method of claim 1, wherein the drilling fluid composition has a reduction in swelling of at least 10% compared to a swelling value obtained from a drilling fluid composition without the AC-PAD, as determined by a linear swell meter.

14. The method of claim 1, wherein the wellbore has a temperature of 20 to 300° C. and a pressure of 50 to 5500 pound-force per square inch (psi).

* * * * *